United States Patent
Davis et al.

(10) Patent No.: US 11,893,881 B2
(45) Date of Patent: Feb. 6, 2024

(54) ADAPTABLE WIRELESS POWER TO A SECURITY SYSTEM

(71) Applicant: Kortek Industries Pty Ltd, Brisbane (AU)

(72) Inventors: Benjamin Davis, Alderley (AU); Matthew Davis, Sanctuary Cove (AU); Barrie Davis, Sanctuary Cove (AU)

(*) Notice: Subject to any disclaimer, the term of this patent is extended or adjusted under 35 U.S.C. 154(b) by 0 days.

(21) Appl. No.: 18/105,860

(22) Filed: Feb. 5, 2023

(65) Prior Publication Data

US 2023/0186758 A1   Jun. 15, 2023

Related U.S. Application Data

(60) Continuation of application No. 17/113,267, filed on Dec. 7, 2020, now Pat. No. 11,574,535, which is a
(Continued)

(51) Int. Cl.
| | |
|---|---|
| G08C 17/02 | (2006.01) |
| H05B 47/10 | (2020.01) |
| H05B 47/16 | (2020.01) |
| H05B 47/19 | (2020.01) |
| H02J 4/00 | (2006.01) |
| G05D 23/19 | (2006.01) |

(Continued)

(52) U.S. Cl.
CPC ............. *G08C 17/02* (2013.01); *G05B 15/02* (2013.01); *G05D 23/1917* (2013.01); *G06F 1/26* (2013.01); *H02J 4/00* (2013.01); *H04W 52/04* (2013.01); *H05B 47/10* (2020.01); *H05B 47/16* (2020.01); *H05B 47/19* (2020.01); *Y02B 20/40* (2013.01)

(58) Field of Classification Search
CPC .... G08C 17/02; G05B 15/02; G05D 23/1917; G06F 1/26; H02J 4/00; H04W 52/04; H05B 47/10; H05B 47/16; H05B 47/19; Y02B 20/40
See application file for complete search history.

(56) References Cited

U.S. PATENT DOCUMENTS

| | | | |
|---|---|---|---|
| 3,733,528 | A | 5/1973 | Gilbreath |
| 5,909,183 | A | 6/1999 | Borgstahl et al. |

(Continued)

FOREIGN PATENT DOCUMENTS

| | | |
|---|---|---|
| CN | 1925527 A | 3/2007 |
| CN | 102186281 A | 3/2011 |

(Continued)

OTHER PUBLICATIONS

PCT International Search Report for PCT/AU2012/000959, dated May 16, 2013, 21 pages, PCT App No. PCT/AU2012/000959, filed Aug. 15, 2012 to Davis, Barrie et al., titled "Adaptable Wireless Power, Light and Automation System".

(Continued)

*Primary Examiner* — Tejal Gami
(74) *Attorney, Agent, or Firm* — Todd Martin

(57) ABSTRACT

A power control unit (100) and method of use thereof for varying the supply of electricity to an electrical apparatus using a wireless communications link between a controller (20) and the power control unit (100). The power control unit (100) is adapted to alternatively communicate with the controller (20) using a non-peer-to-peer communications standard or a peer-to-peer communications standard such as Wi-Fi Direct.

12 Claims, 15 Drawing Sheets

Related U.S. Application Data continuation of application No. 15/925,767, filed on Mar. 20, 2018, now Pat. No. 10,862,313, which is a continuation of application No. 14/272,436, filed on May 7, 2014, now Pat. No. 9,923,376, which is a division of application No. PCT/AU2012/000959, filed on Aug. 15, 2012.

(60) Provisional application No. 61/556,751, filed on Nov. 7, 2011, provisional application No. 61/641,166, filed on May 1, 2012, provisional application No. 61/652,485, filed on May 29, 2012, provisional application No. 61/678,020, filed on Jul. 31, 2012, provisional application No. 61/678,810, filed on Aug. 2, 2012.

(51) Int. Cl.
- *G06F 1/26* (2006.01)
- *G05B 15/02* (2006.01)
- *H04W 52/04* (2009.01)

(56) References Cited

U.S. PATENT DOCUMENTS

| | | |
|---|---|---|
| 6,585,596 B1 | 7/2003 | Leifer et al. |
| 7,024,501 B1 | 4/2006 | Wright |
| 7,380,145 B2 | 5/2008 | Albulet |
| 7,499,028 B2 | 3/2009 | Eichenberger et al. |
| 7,860,495 B2 | 12/2010 | McFarland |
| 7,964,989 B1 | 6/2011 | Puschnigg et al. |
| 8,290,515 B2 | 10/2012 | Staton et al. |
| 8,385,907 B2 | 2/2013 | Misumi et al. |
| 8,428,081 B2 | 4/2013 | Diab et al. |
| 8,478,450 B2 | 7/2013 | Lu et al. |
| 8,995,981 B1 | 3/2015 | Aginsky et al. |
| 9,043,047 B2 | 5/2015 | Feldkamp et al. |
| 9,077,716 B2 | 7/2015 | Myers et al. |
| 9,319,234 B2 | 4/2016 | Davis et al. |
| 9,363,346 B2 | 6/2016 | Sutardja et al. |
| 9,691,201 B2 | 6/2017 | Myers et al. |
| 2002/0130652 A1 | 9/2002 | Bessler |
| 2005/0096753 A1 | 5/2005 | Arling et al. |
| 2005/0174962 A1 | 8/2005 | Gurevich |
| 2005/0219208 A1 | 10/2005 | Eichenberger et al. |
| 2007/0290793 A1 | 12/2007 | Tran |
| 2007/0293208 A1 | 12/2007 | Loh et al. |
| 2008/0123580 A1 | 5/2008 | Vathulya |
| 2008/0143493 A1 | 6/2008 | Nam et al. |
| 2008/0218148 A1 | 9/2008 | Robertson et al. |
| 2009/0058635 A1 | 3/2009 | LaLonde et al. |
| 2009/0316671 A1 | 12/2009 | Rolf et al. |
| 2010/0031295 A1 | 2/2010 | Krzyzanowski et al. |
| 2010/0037071 A1 | 2/2010 | Chang |
| 2010/0099396 A1 | 4/2010 | Huq |
| 2010/0141153 A1 | 6/2010 | Recker et al. |
| 2010/0271802 A1 | 10/2010 | Recker et al. |
| 2010/0297941 A1 | 11/2010 | Doan et al. |
| 2010/0327766 A1 | 12/2010 | Recker et al. |
| 2011/0026504 A1 | 2/2011 | Feinberg |
| 2011/0050451 A1 | 3/2011 | Mierta |
| 2011/0065458 A1 | 3/2011 | Staton et al. |
| 2011/0065485 A1 | 3/2011 | Jin et al. |
| 2011/0121654 A1 | 5/2011 | Recker et al. |
| 2011/0133655 A1 | 6/2011 | Recker et al. |
| 2011/0173313 A1 | 7/2011 | Owhadi et al. |
| 2011/0225305 A1 | 9/2011 | Vedantham et al. |
| 2012/0026726 A1 | 2/2012 | Recker et al. |
| 2012/0043889 A1 | 2/2012 | Recker et al. |
| 2012/0080944 A1 | 4/2012 | Recker et al. |
| 2012/0091804 A1 | 4/2012 | Altonen et al. |
| 2013/0142181 A1 | 6/2013 | Makim et al. |
| 2014/0244044 A1 | 8/2014 | Davis et al. |
| 2014/0244045 A1 | 8/2014 | Davis et al. |
| 2014/0244063 A1 | 8/2014 | Davis et al. |
| 2015/0056979 A1 | 2/2015 | Davis et al. |
| 2015/0287041 A1 | 10/2015 | Davis et al. |
| 2016/0249439 A1 | 8/2016 | Recker et al. |

FOREIGN PATENT DOCUMENTS

| | | |
|---|---|---|
| CN | 102098761 | 6/2011 |
| JP | 2006157098 A | 11/2004 |
| WO | 2005084339 A3 | 9/2005 |
| WO | 2010085138 A3 | 7/2010 |

OTHER PUBLICATIONS

"Mixed-Mode WLAN: Integration of Ad Hoc Mode with Wireless LAN infrastructure" IEEE GLOBECOM 2003, pp. 231-235, Chen et al.

Remote-Controllable Power Outlet System for Home Power Management, Chia-Hung Lien, Ting-Wen Bai and Ming-Bo Lin, IEEE Transactions on Consumer Electronics vol. 53, No. 4, Nov. 2007 "pp. 1634-1641".

Design of Smart Home System Based on ARM9 and Zigbee, Tan-Li Zhang, You-Yun Yan and Dong-Bing Tu, Department of Electrical Engineering and Automation, Henan Polytechnic University, Jiao Zuo 434000.

Network Device Client and/or
Group Participant/Access Point
(power control unit)

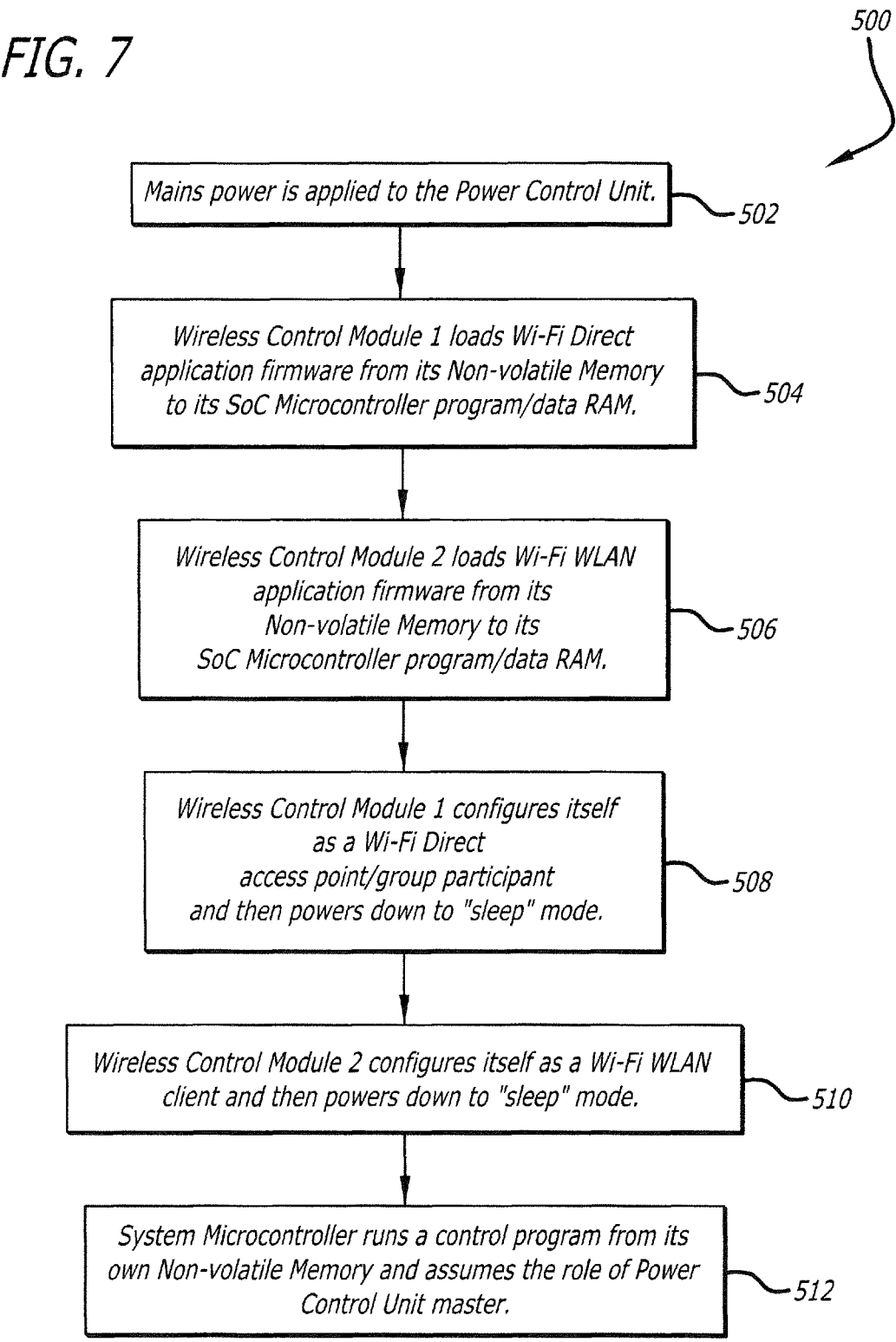

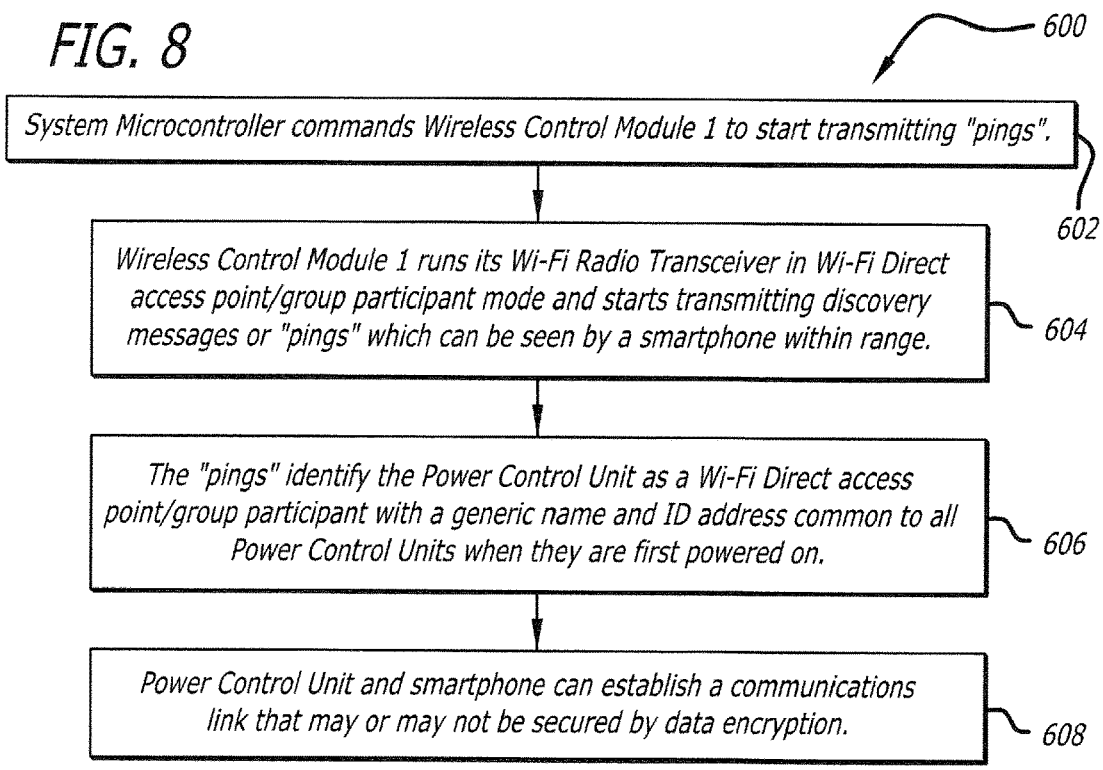
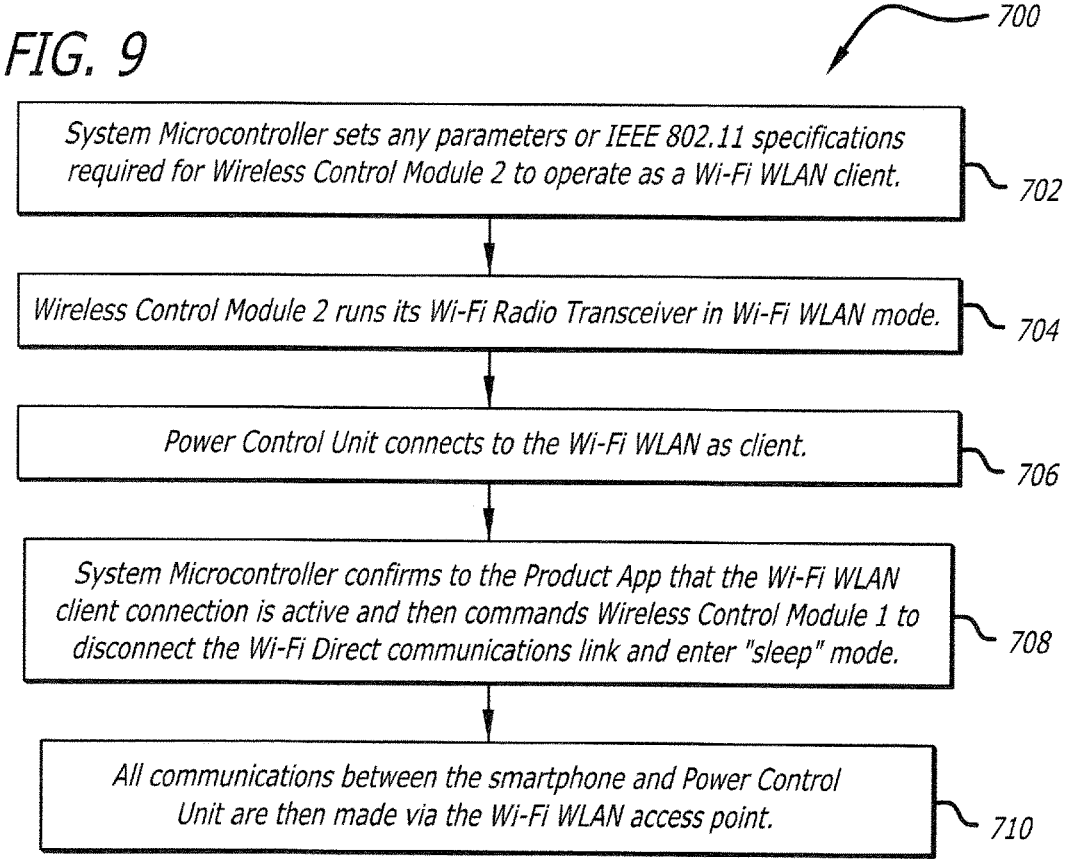

ADAPTABLE WIRELESS POWER TO A SECURITY SYSTEM

CROSS REFERENCE TO RELATED APPLICATIONS

This application is a continuation of U.S. application Ser. No. 17/113,267, filed Dec. 7, 2020; which is a continuation of U.S. application Ser. No. 15/925,767, filed Mar. 20, 2018, now U.S. Pat. No. 10,862,313; which is a continuation of U.S. application Ser. No. 14/272,436, now U.S. Pat. No. 9,923,376; which is a divisional of, and claims the benefit of the filing date of International Patent Application No. PCT/AU2012/000959, filed Aug. 15, 2012, entitled "Adaptable wireless power, light and automation system"; which claims the benefit of: U.S. Application No. 61/556,751, filed Nov. 7, 2011; U.S. Application No. 61/641,166, filed May 1, 2012; U.S. Application 61/652,485, filed May 29, 2012; U.S. Application No. 61/678,020, filed Jul. 31, 2012; and U.S. Application No. 61/678,810, filed Aug. 2, 2012; all of the above referenced applications are incorporated by reference herein in their entireties.

FIELD OF INVENTION

The present invention relates to the control of mains power, lighting and automation in domestic and commercial applications using standard portable devices which support Wi-Fi such as smartphones, tablets, laptop/notebook/netbook/ultrabook computers and similar items to act as a personal controller for the system utilizing a wireless peer-to-peer communications link or a wireless local area network between the devices.

BACKGROUND OF INVENTION

The proliferation of domestic Wireless Local Area Networks (WLANs) for connecting computers to the Internet and sharing peripherals such as scanners and printers has created a ready-made framework for home automation. In most cases these networks use wireless technology that conforms to the IEEE 802.11 standards, operate in accordance with the Wi-Fi Alliance specifications and are generally known as "Wi-Fi". Terms such as "infrastructure Wi-Fi", "Wi-Fi network", "legacy Wi-Fi" and others are commonly used to refer to wireless local area networks supported by an access point device and conforming to the Wi-Fi Alliance specifications. For ease of reference, such networks will be described using the term "Wi-Fi WLAN" although it will be understood that other terminology could be used.

Conventional Wi-Fi WLANs are typically based on the presence of a specific control device known as a wireless access point or AP. These devices provide physical support for the wireless network, perform bridging and routing between devices on the network and allow devices to be added or removed from the network.

In most cases a home Wi-Fi WLAN also includes a wired or wireless connection to the telephone Wide Area Network (WAN) for broadband Internet services. The devices connected to the Wi-Fi WLAN can communicate with each other and to the Internet via the Wi-Fi WLAN access point that acts as a gateway for all communications.

Another Wi-Fi Alliance specification called Wi-Fi Direct can also be used to connect devices wirelessly on a peer-to-peer or 1:1 basis. With Wi-Fi Direct, a Wi-Fi WLAN access point is not required and the wireless communication link is established directly between the two connecting devices. For ease of reference, preferred embodiments of the invention which utilize a peer-to-peer communications link will be described using Wi-Fi Direct, though the invention is not so limited. For example only, peer-to-peer communications may be established using other specifications such as Bluetooth, and other specifications that may be developed over time.

For home automation applications such as the control of power and lighting, both methods have advantages and disadvantages. A Wi-Fi WLAN with an Internet connection allows home automation devices to be connected to the Internet and be controlled from virtually anywhere in the world.

It can be appreciated that a WLAN system that is connected to the Internet, or has its wireless system extended beyond the confines of a controlled area, is open to external attacks or monitoring from third parties such as hackers, governments and private companies. In addition, as all communications pass through a single wireless access point, the failure of this critical device renders the complete home automation system inoperable.

While there are well established regulatory procedures in place for operational safety of electrical/electronic devices and testing regimes to ensure commercial products meet these requirements, there are currently none for functional safety. There are many cases where home automation systems based on WLANs have been compromised by third parties and private data, including personal video footage, has been published on the Internet or used for commercial purposes without the permission of the owner.

Wi-Fi Direct, by virtue of its wireless peer-to-peer or 1:1 architecture, requires the communicating devices to be within a reasonable proximity of each other, for example, 10-20 metres. It can be appreciated that this relatively close proximity has a greatly reduced chance of external attacks from third parties, but does not have the capability of being controlled remotely.

There are many applications where the ability to control low security home automation functions such as turning on an outside light while some distance from the home could be a convenient, but not a critical function. Alternatively, there are other applications such as opening a garage door which could also be possible, but better suited to local rather than remote control due to the risk of third party intrusions.

SUMMARY

In one preferred embodiment, the present invention includes Radio Frequency (RF) Amplifier and Switching Circuits, a Wi-Fi System on Chip (Wi-Fi SoC), Non-volatile Memory and Power Control Circuits. The RF Amplifier and Switching Circuits may include several components and/or arrangements including power amplifiers, low noise amplifiers, baluns, diplexers, printed circuit board (PCB) and/or chip aerials depending on the system requirements.

The Wi-Fi SoC is a highly integrated, single chip component which includes a Wi-Fi radio transceiver, microcontroller, system support functions and a system interface for connection to external microcontrollers, circuits and/or devices. The Non-volatile Memory is preferably a read/write memory which is able to retain its stored data when power is removed. Typically, the Non-volatile Memory would be of the type called "flash memory" and would support a data transfer connection and protocol known as the Serial Peripheral Interface bus or SPI bus.

In a preferred embodiment, the RF Amplifier and Switching Circuits, Wi-Fi SoC and Non-volatile Memory form a Wi-Fi Control Module, which acts as a communications element that can be incorporated into any number of different devices to regulate and/or control power, light and automation functions for home, business or commercial applications. The Wi-Fi Control Module provides the wireless communications link between an external remote controller and the co-located Power Control Circuits which physically perform the power, light and automation functions.

The Power Control Circuits may be directly controlled by the Wi-Fi SoC microcontroller or the Power Control Circuits may include a separate microcomputer/microcontroller depending on the application complexity.

The Wi-Fi Control Module is preferably able to perform the wireless communications functions utilizing the Wi-Fi Alliance Wi-Fi WLAN and Wi-Fi Direct specifications which are amended from time to time. As used herein, the term "Wi-Fi WLAN device" refers to a device configured to support the Wi-Fi WLAN specification. As used herein, the term "Wi-Fi Direct device" refers to a device configured to support the Wi-Fi Direct specification, which is amended from time to time. The Wi-Fi Alliance defines "Wi-Fi" as any "wireless local area network (WLAN) products that are based on the Institution of Electrical and Electronic Engineers (IEEE) 802.11 standards;" this definition is expressly adopted herein.

The personal controller is preferably a cellular or mobile phone commonly known as a smartphone which supports Wi-Fi or Wi-Fi WLAN. As used herein, "Wi-Fi WLAN" refers to the IEEE 802.11 a/b/g/n/ac/ad specification and amendments or extensions. The personal controller may also support the Wi-Fi Direct specification and other wireless communications specifications such as Bluetooth. The personal controller is also preferably equipped with location capability including Global Positioning System technology (GPS) and/or other positional technology such as, by way of example only, assisted GPS, synthetic GPS, cell ID, inertial sensors, Bluetooth beacons, terrestrial transmitters, and geomagnetic field techniques enabling the controller to determine its relative global location. Unless otherwise noted, the personal controller will be described in terms of a smartphone, though the invention is not so limited. For example only, the personal controller may be any portable device which can download or install by other means an applications program, have a suitable interface the user can interact with to control the applications program in order to execute required functions, have location capability, and have peer-to-peer communications capability to enable communications to be established with a power control unit. Examples of such devices include smartphones, tablets, laptops and notebook personal computers.

There are other wireless standards available that could be used to implement the wireless link, such as Bluetooth, Zigbee, and Near Field Communications (NFC). Specifically, it should be noted that most smartphones also support NFC and the Bluetooth wireless specification SIG class 2.1+EDR or later. As with Wi-Fi Direct, NFC or Bluetooth are also peer-to-peer wireless communications methods and could be used to provide similar capability for some embodiments of the invention without changing the originality and function of the invention as described herein.

The functions of a smartphone, being a portable computer, are controlled by its operating system in a similar way to most other computers. The operating system, in conjunction with resident applications programs, known as "Apps", executes functions in response to a user's commands. By entering an appropriate command into the smartphone, the user can have the appropriate App send a control message to the Wi-Fi Control Module which is then passed to the co-located power control circuits for interpretation and activation.

The Wi-Fi Control Module is a device that can form a communications link with a smartphone using Wi-Fi Direct and/or a Wi-Fi WLAN. It can be appreciated that when a Wi-Fi Control Module is connected to a Wi-Fi WLAN, any smartphone with Wi-Fi capability also connected to the same Wi-Fi WLAN can use an appropriate App to communicate with the Wi-Fi Control Module. In this way, a user can enter the command they require to be executed and send it to the appropriate Wi-Fi Control Module via the Wi-Fi WLAN. In this case the smartphone can be in the vicinity of the Wi-Fi WLAN access point, or the smartphone could be at a remote location and communicate with the Wi-Fi WLAN access point via the Internet.

It can be appreciated that a Wi-Fi Control Module operating as a Wi-Fi Direct access point/group participant can communicate directly with a smartphone without the requirement of a Wi-Fi WLAN. In this case, the Wi-Fi Control Module appears as a Wi-Fi access point if the personal controller is not using Wi-Fi Direct to communicate with the Power Control Device; or if the personal controller is using Wi-Fi Direct to communicate, negotiates between the Wi-Fi Control Module and the personal controller which of the Power Control Device and personal controller will assume a Wi-Fi Direct group owner role and establishes a peer-to-peer connection. The user is then able to send commands directly to the selected Wi-Fi Control Module without the need for any other device. In this case, the Wi-Fi Control Module and smartphone communicate directly with each other, but only if they are within wireless range.

A Power Control Device or Power Control Unit is preferably formed by the combination of a Wi-Fi Control Module and Power Control Circuits. The Power Control Circuits perform the switching and/or regulation of electricity to attached electrical, electronic or lighting equipment and/or devices in accordance with instructions from the user via the smartphone.

The Power Control Circuits are preferably co-located and execute the user control functions. Examples of power control circuits that may be controlled by the Wi-Fi Control Module are described in more detail in PCT Application No. PCT/AU2011/00166, filed Dec. 29, 2011, titled "Wireless Power, Light and Automation Control," the entire disclosure of which is incorporated herein by reference.

It can be appreciated that in power, light and automation control applications, some applications are more suited to Wi-Fi WLAN configurations while others are more suited to Wi-Fi Direct configurations. For example, if one application requires the Wi-Fi Control Module to be part of a Wi-Fi WLAN and another application requires the Wi-Fi Control Module to provide a Wi-Fi Direct peer-to-peer connection, it can be seen that these functions would normally require individual specific control devices to be installed.

The present invention in one preferred embodiment provides a dual mode, single radio Wi-Fi Control Module which in a first mode may provide a Wi-Fi Direct peer-to-peer connection to a smartphone and in a second mode can be configured by the user to connect to a Wi-Fi WLAN. If the smartphone supports Wi-Fi Direct, the smartphone and the Wi-Fi Control Module will negotiate with each other as to which will be the group owner.

The Power Control Unit preferably has its Wi-Fi Control Module set to initially function in Wi-Fi Direct access point/group participant mode irrespective of its final configuration. Because the Wi-Fi Direct access point/group participant mode is a peer-to-peer connection, as soon as power is applied to the Wi-Fi Control Module, it can be recognised by a smartphone and a wireless communications link can be established. Once the link is established, the user is able to activate a smartphone App which establishes a data path between the smartphone and the Wi-Fi Control Module. Using the smartphone App, the user can set the operational parameters required for a Wi-Fi WLAN or Wi-Fi Direct device, name the device, set an encryption key, enter a password and any other requirements. When this procedure is completed the user can command the Wi-Fi Control Module to "restart" at which time it will configure itself to only recognise the parameters which have been specified during the setup process.

If the Wi-Fi Control Module is configured to operate as a Wi-Fi Direct device, it would continue to do so. The Wi-Fi Control Module would only connect to smartphones which can fully comply with its connection requirements to establish a communications link.

If the Wi-Fi Control Module is configured to operate as a Wi-Fi WLAN device, the smartphone App would configure the Wi-Fi Control Module for connection to a Wi-Fi WLAN. When the Wi-Fi Control Module is "restarted" it would appear as a client device on the Wi-Fi WLAN and would only be accessible to devices which are also connected to the same Wi-Fi WLAN.

In either mode, once the Wi-Fi Control Module has been configured, the smartphone App can be used to control the functions of the device. In the Wi-Fi WLAN mode the smartphone App communicates with the selected Wi-Fi Control Module via the Wi-Fi WLAN access point. In the Wi-Fi Direct mode, the smartphone App communicates directly with the selected Wi-Fi Control Module.

There are applications where it may be preferable to have a Power Control Module provide both a Wi-Fi WLAN and a Wi-Fi Direct connection simultaneously or concurrently (Concurrent Connections). With such a Power Control Unit the user could allow third parties to control the Power Control Unit functions via a Wi-Fi Direct connection, but not allow access to the concurrent Wi-Fi WLAN connection, thus preventing access to other WLAN devices.

The present invention in another preferred embodiment provides for a dual mode, dual radio Power Control Unit incorporating two Wi-Fi Control Modules where each module can be configured by the user to be a Wi-Fi WLAN device or a Wi-Fi Direct device. The dual mode, dual radio Power Control Unit is able to provide simultaneous or Concurrent Connections.

The present invention in another preferred embodiment provides a dual mode, single radio Wi-Fi Control Module which can provide Concurrent Connections by means of virtual channels. Each virtual channel can be configured by the user to appear as a Wi-Fi WLAN device or a Wi-Fi Direct device, where each connection may be formed on the same or a different physical channel. The methods to create virtual channels are already known to those skilled in the art and are not described herein.

The present invention in a further preferred embodiment provides a Power Control Unit for controlling lights with the ability to run a schedule configured by an applications program, or Product App, running on a smartphone, the schedule specifying the operating times and dimming of attached lights, the command instructions being transferred from a smartphone to the Power Control Unit through a peer-to-peer communications link. The Product App is preferably able to determine its global location from the smartphone location capability and offer a Default Schedule of on/off times based on specific sunset/sunrise with daylight savings correction and/or business hours with public holiday profiles and special events and/or other conditional elements for the specific location that the smartphone location capability reports as its current global position. The Default Schedule may be pre-stored in the Product App or may be downloaded by the Product App from a remote server using the smartphone's cellular or Wi-Fi communications, the operation of which is well known to those skilled in the art. The Product App will preferably allow for user customization of a Default Schedule for the specific application, including adjustment of times for a light, bank of lights, or many banks of lights either individually or as groups, and may include the ability to set dimming levels of lights individually or as groups with the possibility to have various dimming scenes over time.

In another preferred embodiment, schedules to be programmed into the power control unit via the Product App may be verified through a Preview Mode where the Product App controls power control unit parameters through the peer-to-peer communications link between smartphone and power control unit, allowing the Product App to simulate the programmed schedule at any particular time in a similar fashion to fast forwarding or rewinding a movie on a video recorder. In one preferred aspect, the Product App may display a dynamic graphical representation of the time and light parameters corresponding to the parameters programmed for that time in order to identify how lights will react as Preview Mode runs. The user can preferably fast forward, rewind, play and pause Preview Mode in order to make any necessary adjustments, which are dynamically updated in the programmed schedule in the Product App. When all edits have been made, the Product App preferably transfers the programmed schedule to power control unit memory in order to run locally on power control unit.

In another preferred embodiment, the user may run the Preview Mode in a step fashion where the time period is divided into step segments, the user being able to progress the period from one step to the next.

In an additional preferred embodiment, the Product App may execute the Preview Mode by causing a programmed schedule stored in the power control unit to run other than real time.

The Power Control Unit may have an exposed human interface in the form of a switch, or switches, that may allow a user to turn power to lights off; turn power to lights on while overriding Power Control Unit programmed schedule; or run Power Control Unit programmed schedule. These settings are provided by way of example only. It will be appreciated that other switch configurations and functions may be supported without departing from the scope of the present invention. In one preferred embodiment, it may be desirable to have no exposed human interface in order to reduce the incidence of vandalism or create a highly weather resistant unit. By way of example only, a typical application of the Power Control Unit could be automatically controlling lights in the surrounding gardens of a building in Austin TX, USA. By using the location capability on a smartphone, the Product App could present a Default Schedule with sunset/sunrise times specifically for Austin TX, USA. The user could choose to customize the Default Schedule by dimming lights to half power from 1 am until dawn in order to save on energy. The user could then preview the schedule at a rate faster than real time to determine if the settings are suitable and, when satisfied, program this into power control unit using a peer-to-peer communications link between smartphone and Power Control Unit for total automation of the lights.

It can be appreciated that the Wi-Fi Control Module can be incorporated into many forms of power, light and automation control systems and applications where power switches, power boards, light switches, light dimmers, wall switches are some more common examples.

BRIEF DESCRIPTION OF THE FIGURES

FIG. 7 is a flow diagram showing a typical "power up" sequence for a dual channel Power Control Unit.

FIG. 8 is a flow diagram showing a typical "discovery message" sequence for a dual channel Power Control Unit.

FIG. 9 is a flow diagram showing a typical "system restart" sequence for a dual channel Power Control Unit initializing in Wi-Fi WLAN client mode.

DETAILED DESCRIPTION OF THE DRAWINGS

Alternative embodiments of the invention will be apparent to those skilled in the art from consideration of the specification and practice of the invention disclosed herein. It is intended that the specification and examples be considered as exemplary only, with a true scope and spirit of the invention being indicated by the claims which follow.

Figure 1:
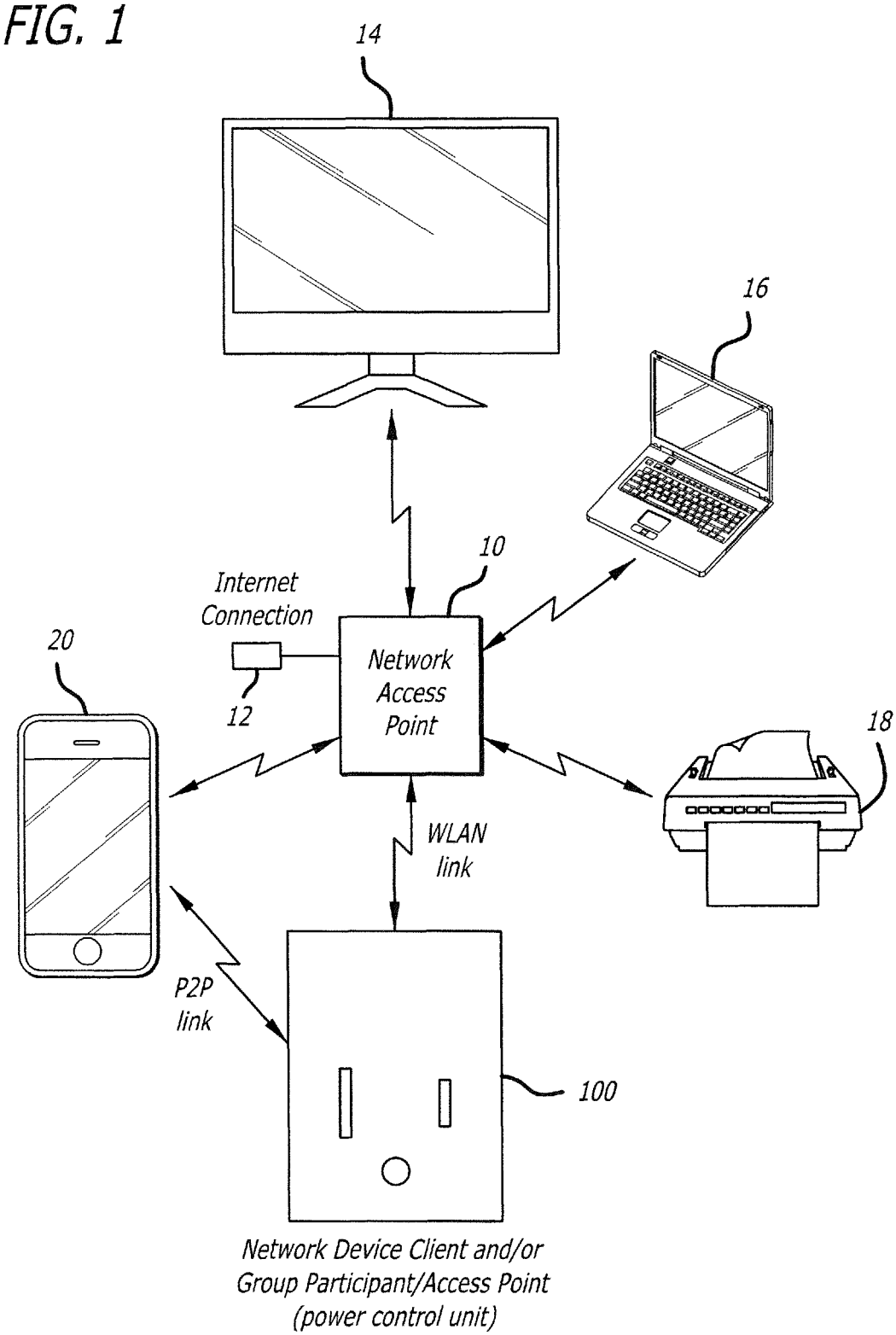
FIG. 1 is a system pictorial representation of a Power Control Unit and smartphone controller used in a Wi-Fi Direct peer-to-peer communications link with each other, and used in a Wi-Fi WLAN in accordance with one preferred embodiment of the present invention.

FIG. 1 is a system pictorial representation of a typical Wi-Fi WLAN which has an access point 10 as the network control unit or hub. Access point 10 has an Internet connection 12. Wirelessly connected to access point 10 are shown five network clients, although the number of network clients is only limited by the capabilities of access point 10. The network, for example, can have access point 10, network client 14 (smart TV), network client 16 (computer) and network client 18 (printer).

Smartphone 20 preferably has a user interface in the form of a touch sensitive graphical screen, a memory for storing the Product App and associated data, a system processor and location capability. Location capability preferably includes technology for determining relative global position through satellite triangulation which may conform to specifications such as the USA Global Positioning System (GPS), Russian Global Navigation Satellite System (GOLNASS), European Union Galileo Positioning System, Chinese Compass Navigation System, Indian Regional Navigational Satellite System or others. Location capability may also include technology for determining relative global position based on assisted GPS, synthetic GPS, cell ID, inertial sensors, Bluetooth beacons, terrestrial transmitters, geomagnetic field techniques or any combination thereof with, or without, satellite methods.

Communications over the Wi-Fi WLAN pass through access point 10. For a smartphone and a Power Control Unit to communicate with each other via the Wi-Fi WLAN, they are usually part of the same network. As shown in FIG. 1, smartphone 20 and Power Control Unit 100 are also network clients of access point 10. For smartphone 20 to communicate with Power Control Unit 100, it would communicate with access point 10 and the access point would pass any messages from smartphone 20 onto Power Control Unit 100. The same happens for any messages computer 16 sends to Power Control Unit 100. Accordingly, it can be seen that: (1) access point 10 must continuously operate for the network to be available for communications; (2) the network is limited to an area which is defined by the maximum radio transmission distance between a network client and the access point; (3) a network requires an access point and at least one network client; and (4) at least one network client must be able to configure and maintain the access point operations.

To avoid some of the restrictions inherent with a Wi-Fi WLAN, Power Control Unit 100 may be configured to establish a peer-to-peer communications link with smartphone 20 as shown in FIG. 1, thus bypassing the Wi-Fi WLAN. In this case the peer-to-peer smartphone can wirelessly connect directly to Power Control Unit 100 without requiring the services of any additional device. If smartphone 20 is also a Wi-Fi Direct device, it will negotiate with Power Control Unit 100 to determine which of them will be the group owner. The access point/group owner can set up 1:N connections if allowed so that more than one client could have a communications link with the group owner at the same time, for example, in a hub and spoke arrangement where the access point/group owner is the hub.

Alternatively, the access point/group owner may restrict itself to 1:1 connections in which case it will only establish a communication link with one peer-to-peer client at a time. For example, in FIG. 1 Power Control Unit 100 would preferably communicate with one client, smartphone 20, while operating in a peer-to-peer mode. Accordingly, it can be seen that: (1) a third device such as access point 10 is not required for peer-to-peer communications to be established; (2) the communications link may be formed on an "as needed" basis; and (3) that smartphone 20 should be brought within radio range of the access point/group participant to establish a communications link.

In one preferred embodiment of the invention, Power Control Unit 100 preferably operates by switching roles between a Wi-Fi WLAN client or a Wi-Fi Direct access point/group participant.

It can be seen by those skilled in the art that both a Wi-Fi WLAN connection and a Wi-Fi Direct peer-to-peer connection between a smartphone controller and a Power Control Unit provide different functionality. The Wi-Fi WLAN allows a Power Control Unit to be operated remotely by the smartphone via the Internet. Alternatively, Wi-Fi Direct peer-to-peer connection by virtue of its limited range has high security because Power Control Unit 100 can only be operated when the smartphone is in close proximity. The applicability of the Wi-Fi WLAN and the Wi-Fi Direct methods of a Power Control Unit being operated remotely or locally can be readily appreciated by considering each particular application from their convenience and functional safety aspects.

When Power Control Unit 100 is connected to the Wi-Fi WLAN, it operates as a network client and all communications pass through network access point 10. When Power Control Unit 100 is connected to smartphone 20, it operates as a Wi-Fi Direct access point/group participant and communications are peer-to-peer. It is evident that in terms of the Wi-Fi connections the functionality of Power Control Unit 100 operating as a client is different to Power Control Unit 100 operating as an access point/group participant.

In another preferred embodiment of the invention, Power Control Unit 100 preferably operates as a single device capable of operating as a Wi-Fi WLAN client and/or a Wi-Fi Direct access point/group participant.

Figure 2:
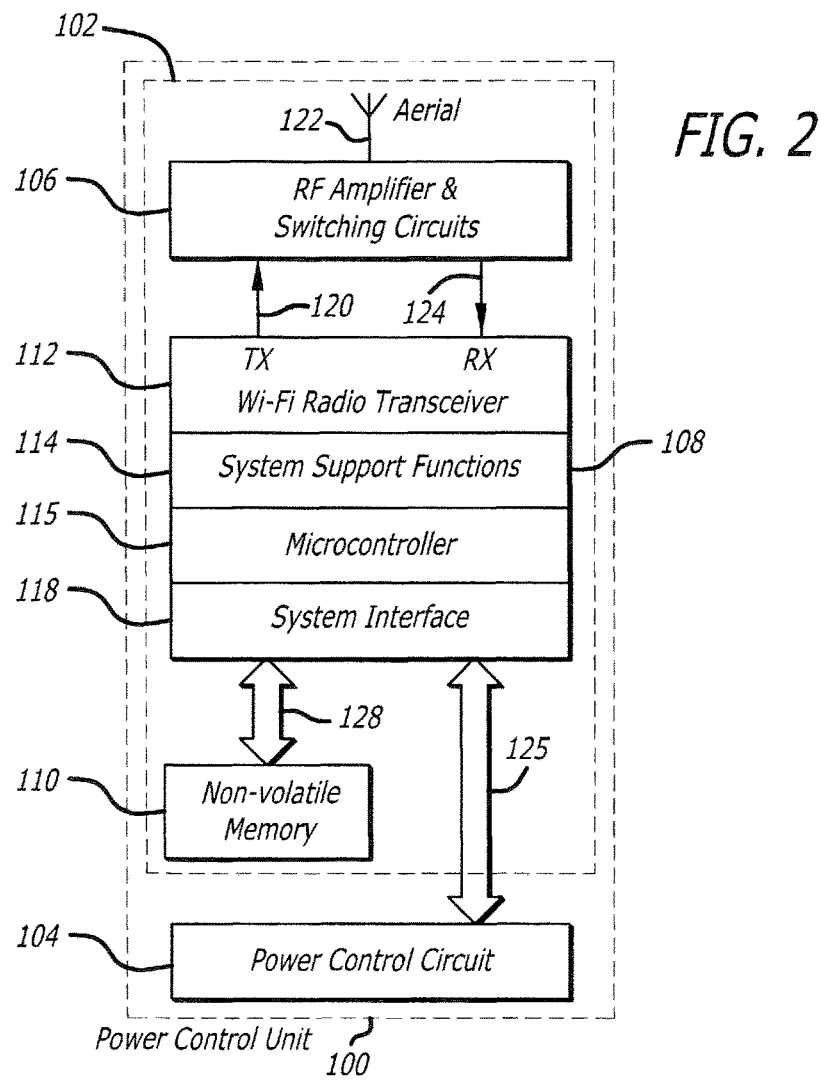
FIG. 2 is a block diagram of the Power Control Unit of FIG. 1.

FIG. 2 is a block diagram of a dual mode, single channel Power Control Unit 100. Power Control Unit 100 preferably includes a Wi-Fi Control Module 102 operatively connected to power control circuits 104. Wi-Fi Control Module 102 can be configured to be a Wi-Fi WLAN client or a Wi-Fi Direct access point/group participant such as shown in FIG. 1. Wi-Fi Control Module 102 preferably has three major functional units: RF Amplifier and Switching Circuits 106, Wi-Fi SoC 108, and Non-volatile Memory 110.

RF Amplifier and Switching Circuits 106 may include several components and arrangements including Power Amplifiers, Low Noise Amplifiers, Baluns, Diplexers, PCB or chip Aerial just to name a few. Particular components and arrangements will depend on the particular system requirements. While certain arrangements and functions of these components are useful for the operation in one or more embodiments of the present invention, they are not the primary focus of this embodiment and are well understood by those skilled in the art such that a detailed description of RF Amplifier and Switching circuits 106 is not required.

As shown in FIG. 2, Wi-Fi SoC 108 is preferably the primary control element and is of the class of integrated circuit components known as a System on Chip (SoC). Wi-Fi SoC 108 preferably has four major sub-systems: a Wi-Fi Radio Transceiver 112, System Support Functions 114, a Microcontroller 115, and a Systems Interface 118.

The Wi-Fi Radio Transceiver of Wi-Fi SoC 108, preferably under the control of Microcontroller 115, generates the radio frequency carriers at the required frequencies, and modulates the carrier with the data to be transferred to a remote device over the wireless communications link. The modulated carrier is sent to RF Amplifier and Switching Circuits 106 via Transmit connection (TX) 120 and then to Aerial 122 where it is transmitted wirelessly to the remote device. Modulated carrier received from the remote device by Aerial 122 is sent from RF Amplifier and Switching Circuits 106 via receive connection (RX) 124 to the Wi-Fi Radio Transceiver of Wi-Fi SoC 108 to be demodulated. The received data is then processed by Microcontroller 115.

System Support Functions 114 of Wi-Fi SoC 108 preferably provide the ancillary functions required by complex SoC components which, by way of example, may include clock generation and timing, protocol engines, and power management, which are preferably specific to each SoC device. Systems Interface 118, which is also preferably specific to each SoC device, preferably provides the physical connections between the internal circuits of Wi-Fi SoC 108 and external circuits such as Power Control Circuits 104 as shown in FIG. 2, external microcontrollers or other circuits and/or devices. A detailed explanation of the operation of the System Support Functions and the Systems Interface is not necessary because they would be understood by those skilled in the art.

The internal program/data memory of Wi-Fi SoC 108 is preferably volatile. Non-volatile Memory 110 is preferably provided to store Wi-Fi Control Module 102 firmware for when the device is not powered. It will be appreciated that some SoC devices may have internal non-volatile memory which may be substituted for Non-volatile Memory 110 without departing from the scope of the invention.

Power Control Circuits 104 are shown for completeness and while they are not part of Wi-Fi Control Module 102, they are preferably part of a particular Power Control Unit 100. Depending on the capability of microcontroller 115 of Wi-Fi SoC 108 and the functions required to be performed by Power Control Circuits 104, Wi-Fi SoC 108 may also directly perform the control functions, or an additional external microcontroller or other control element may be incorporated into Power Control Circuits 104 to execute the power control functions independent of Wi-Fi SoC 108. The connection between Wi-Fi SoC 108 and Power Control Circuits 104 is by Interconnection 125 which may take the appropriate form to meet the system interconnection requirements. A detailed description of the function and operation of Power Control Circuits 104 is not required for the understanding of the present invention.

In another preferred embodiment of the invention, the Wi-Fi Radio Transceiver and Microcontroller of Wi-Fi SoC 108 may be individual, but connected elements and it is possible for other functional architectures to be devised which, while being different in form, are still within the scope of the invention.

In one preferred embodiment of the invention, Non-volatile Memory 110 is a separate component and is of the type called "flash memory" although other compatible memory types can be used if desired. Non-volatile Memory 110 is connected to Wi-Fi SoC 108 preferably by an industry standard Serial Peripheral Interface bus or "SPI" bus 128 although other suitable bus or connection arrangements and protocols may also be used and are within the scope of the invention.

Figure 3:
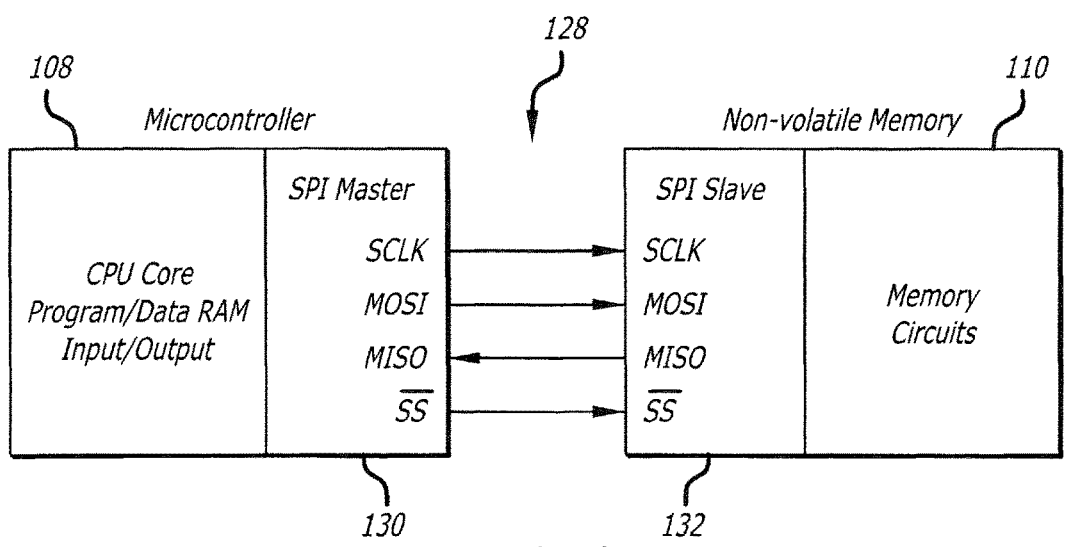
FIG. 3 is a block diagram of a Serial Peripheral Interface bus connecting a Microcontroller and a Non-volatile Memory which forms a portion of the Power Control Unit of FIG. 1.

FIG. 3 is a block diagram showing Wi-Fi SoC 108 connected to Non-volatile Memory 110 via an SPI bus. Wi-Fi SoC 108 is preferably the master device and controls the transfer of data over the SPI bus. Non-volatile Memory 110 is preferably the slave device and responds to commands from Wi-Fi SoC 108. Wi-Fi SoC 108 master SPI bus interface 130 and Non-volatile Memory slave SPI bus interface 132 each preferably includes four data connections being SCLK (serial clock), MOSI (master output, slave input), MISO (master input, slave output) and SS (slave select). The operation of the SPI bus is already known to those skilled in the art and is not described herein. Other data transfer schemes for exchanging data between Wi-Fi SoC 108 and Non-volatile Memory 110 may be used instead of the SPI bus without departing from the scope of the invention.

Figure 5:
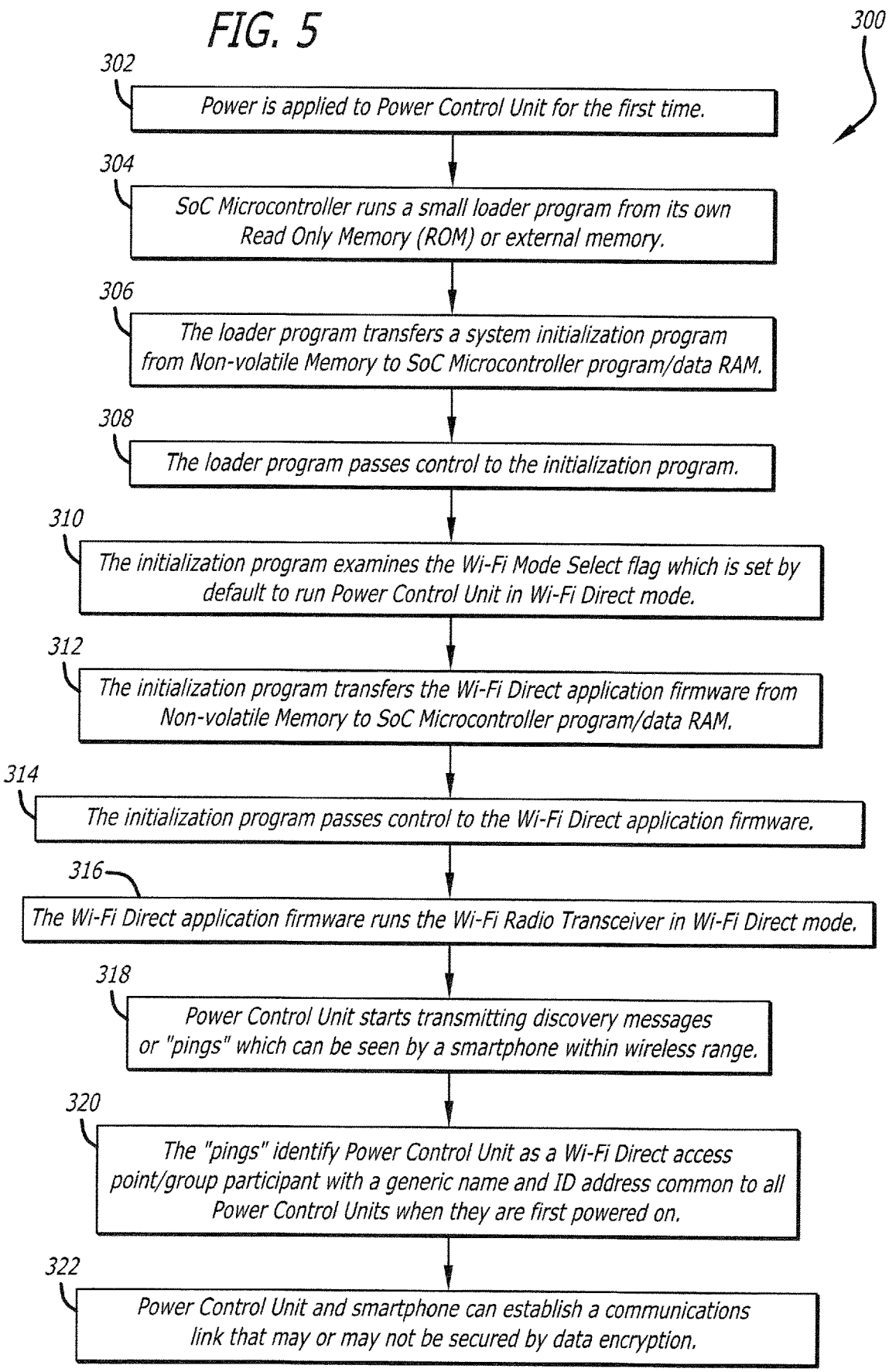
FIG. 5 is a flow diagram showing a typical "power up" sequence for a single channel Power Control Unit initializing in Wi-Fi Direct mode.

When the Power Control Unit is manufactured, Non-volatile Memory 110 preferably holds two firmware control programs: one to operate Wi-Fi SoC 108 as a Wi-Fi WLAN client and the other to operate Wi-Fi SoC 108 as a Wi-Fi Direct access point/group participant. A Wi-Fi Mode Select flag in Non-volatile Memory 110 is initially set to Wi-Fi Direct mode so when power is applied, Power Control Unit 100 initializes as a Wi-Fi Direct access point/group participant. An exemplary "power-up" sequence is shown in FIG. 5.

Having described the preferred components of the Power Control Unit, a method 300 for powering-up the Power Control Unit will now be described with reference to FIG. 5. In step 302, power is applied to the Power Control Unit for the first time. In step 304, the SoC microcontroller runs a small loader program from its own Read Only Memory (ROM) or external memory. In step 306, the loader program transfers a system initialization program from the non-volatile memory to the SoC microcontroller program/data RAM. In step 308, the loader program passes control to the initialization program. In step 310, the initialization program examines the Wi-Fi mode select flag which is set by default to run the Power Control Unit in Wi-Fi Direct mode. In step 312, the initialization program transfers the Wi-Fi Direct application firmware from the non-volatile memory to SoC microcontroller program/data RAM. In step 314, the initialization program passes control to the Wi-Fi Direct application firmware. In step 316, the Wi-Fi Direct application firmware runs the Wi-Fi radio transceiver in Wi-Fi Direct mode. In step 318, the Power Control Unit starts transmitting discovery messages or "pings" which can be seen by a smartphone within wireless range. In step 320, the "pings" identify the Power Control Unit as a Wi-Fi Direct access point/group participant with a generic name and ID address common to all Power Control Units when they are first powered on. In step 322, the Power Control Unit and smartphone can establish a communications link that may or may not be secured by data encryption. It will be appreciated that the steps described above may be performed in a different order, varied, or certain steps added or omitted entirely without departing from the scope of the present invention.

Once the Power Control Unit has been powered-up, the user can identify the presence of the Power Control Unit displayed on the screen of the smartphone as a new Wi-Fi device which needs to be individualised to allow it to be identified from other similar devices. The preferred method to do this requires the user to load a related App (Product App). Instructions on how this is done for each smartphone operating system is preferably included with the Power Control Unit. The procedure is simple and is similar to loading any other App onto a smartphone.

When the Product App is started, it will identify the Power Control Unit as being a new device. This preferably requires re-configuration as a specifically selectable device. At this point, the Product App preferably allows the user to determine if the new Power Control Unit is to remain a Wi-Fi Direct access point/group participant, or connect to a wireless network and become a Wi-Fi WLAN client.

If the user chooses the new Power Control Unit to be a Wi-Fi Direct device, this is selected as the required option on the smartphone. The Product App then leads the user through a series of data inputs using the smartphone's graphics touch screen as the input interface. The Product App also communicates with the Wi-Fi Direct applications program running on the Microcontroller of Wi-Fi SoC 108 and updates the general parameters used for the initial connection with the smartphone to specific parameters which define the Power Control Unit as a unique Wi-Fi Direct product. These may include: (1) setting a unique encryption key so all data transfers between the Power Control Unit and the smartphone are protected; (2) setting the Power Control Unit name to a unique, easily recognisable identifier, e.g., from a product name such as "Power Switch" to "Kitchen TV"; (3) setting the Power Control Unit's unique Wi-Fi address ID so that it becomes an individual device in its own right; and (4) setting a password in the Power Control Unit used to establish a secure link with a smartphone.

The Product App preferably maintains a record of these specific parameters in the memory of the smartphone for future identification of, and connection to, the Power Control Unit.

Once the setup procedure is completed, the Product App preferably commands the Power Control Unit Wi-Fi Direct application's firmware to "restart". When the applications firmware restarts, the Power Control Unit will have its own unique Wi-Fi Direct identity. The smartphone which was used to set this identity will be able to automatically connect because the new specific parameters are known. The Product App can be used to communicate with the Power Control Unit each time the user selects that particular device.

Once a Power Control Unit has been configured, any other smartphone can only be connected if the user knows the specific parameters that are now unique to that particular Power Control Unit. If a second smartphone searches for Wi-Fi access points, it will see the Power Control Unit identified as, for example, "Kitchen TV" with the characteristic that it is "secure". To connect to it, the user will have to know the specific password allocated to communicate with that specific Power Control Unit, otherwise it will not be able to establish a communications link. If the password is known and entered into the smartphone when requested, the communication link between the second smartphone and the Power Control Unit will be established. The Product App is still preferably required to control the Power Control Unit and this may have additional security requirements depending on the nature of the application.

If, instead of configuring the newly installed Power Control Unit as a Wi-Fi Direct access point/group participant, the user chooses it to be a Wi-Fi WLAN client, this is selected as the required option and the Product App determines if there are one or more Wi-Fi WLANs available for the Power Control Unit to connect to as a client. The Product App requests the user to confirm the preferred network and asks the user to input the network password so the Power Control Unit can connect to the Wi-Fi WLAN as a client.

Figure 6:
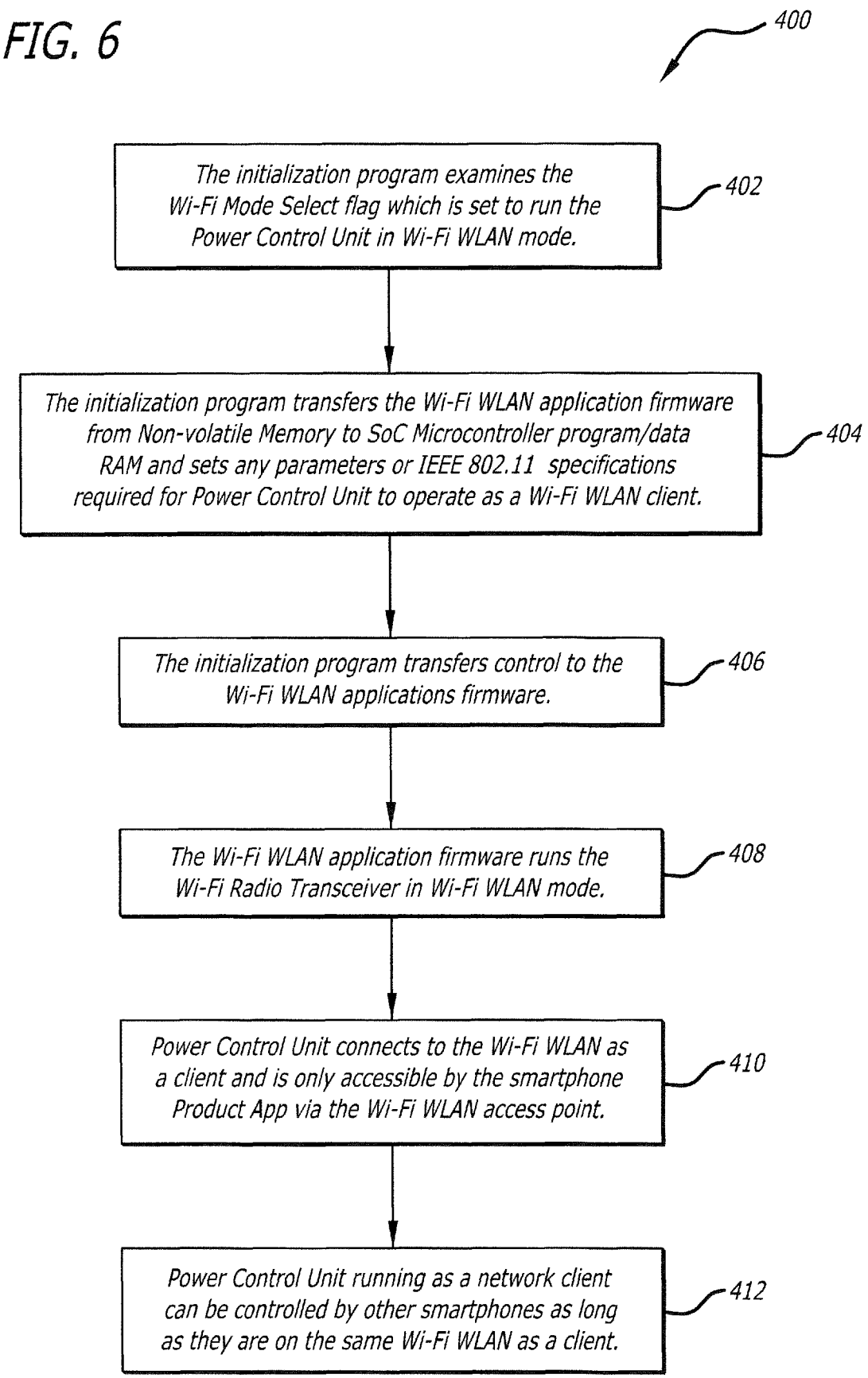
FIG. 6 is a flow diagram showing a typical "system restart" sequence for a single channel Power Control Unit initializing in Wi-Fi WLAN client mode.

The Product App, via the smartphone, communicates with the Wi-Fi Direct applications program running on the microcontroller of Wi-Fi SoC 108 and sets the parameters which will be needed for the Power Control Unit to establish itself as a Wi-Fi WLAN client instead of being a Wi-Fi Direct access point/group participant. When all of the appropriate parameters are known and updated, the Product App commands the Power Control Unit to restart as a Wi-Fi WLAN device. This is a similar procedure to that when power is applied to Power Control Unit for the first time. FIG. 6, by way of example, shows a typical "system restart" sequence.

Referring to FIG. 6, a method 400 for restarting the system is shown and described. In step 402, the initialization program examines the Wi-Fi mode select flag which is set to run the Power Control Unit in Wi-Fi WLAN mode. In step 404, the initialization program transfers the Wi-Fi WLAN application firmware from the non-volatile memory to the SoC microcontroller program/data RAM and sets any parameters or IEEE 802.11 specifications required for the Power Control Unit to operate as a Wi-Fi WLAN client. In step 406, the initialization program transfers control to the Wi-Fi WLAN applications firmware. In step 408, the Wi-Fi WLAN application firmware runs the Wi-Fi radio transceiver in Wi-Fi WLAN mode. In step 410, the Power Control Unit connects to the Wi-Fi WLAN as a client and is only accessible by the smartphone product app via the Wi-Fi WLAN access point. In step 412, the Power Control Unit running as a network client can be controlled by other smartphones as long as they are on the same Wi-Fi WLAN as a client. It will be appreciated that the steps described above may be performed in a different order, varied, or certain steps added or omitted entirely without departing from the scope of the present invention.

Once a Power Control Unit is configured as a Wi-Fi Direct access point/group participant or a Wi-Fi WLAN client, it preferably continues to operate in this mode even after it has been powered off. All of the specific operating parameters for each mode are saved in Non-volatile Memory 110 and are retained if power is lost. When power is restored, the microcontroller of Wi-Fi SoC 108 powers up in the same Wi-Fi mode as was running before power was removed, and the appropriate firmware and operating parameters are restored from Non-volatile memory 110.

In another preferred embodiment of the invention, a dual mode is supported by dual radios provided by two separate Wi-Fi Wireless Subsystems that can operate simultaneously and can provide individual and concurrent Wi-Fi Direct and Wi-Fi WLAN connections if desired.

Figure 4:
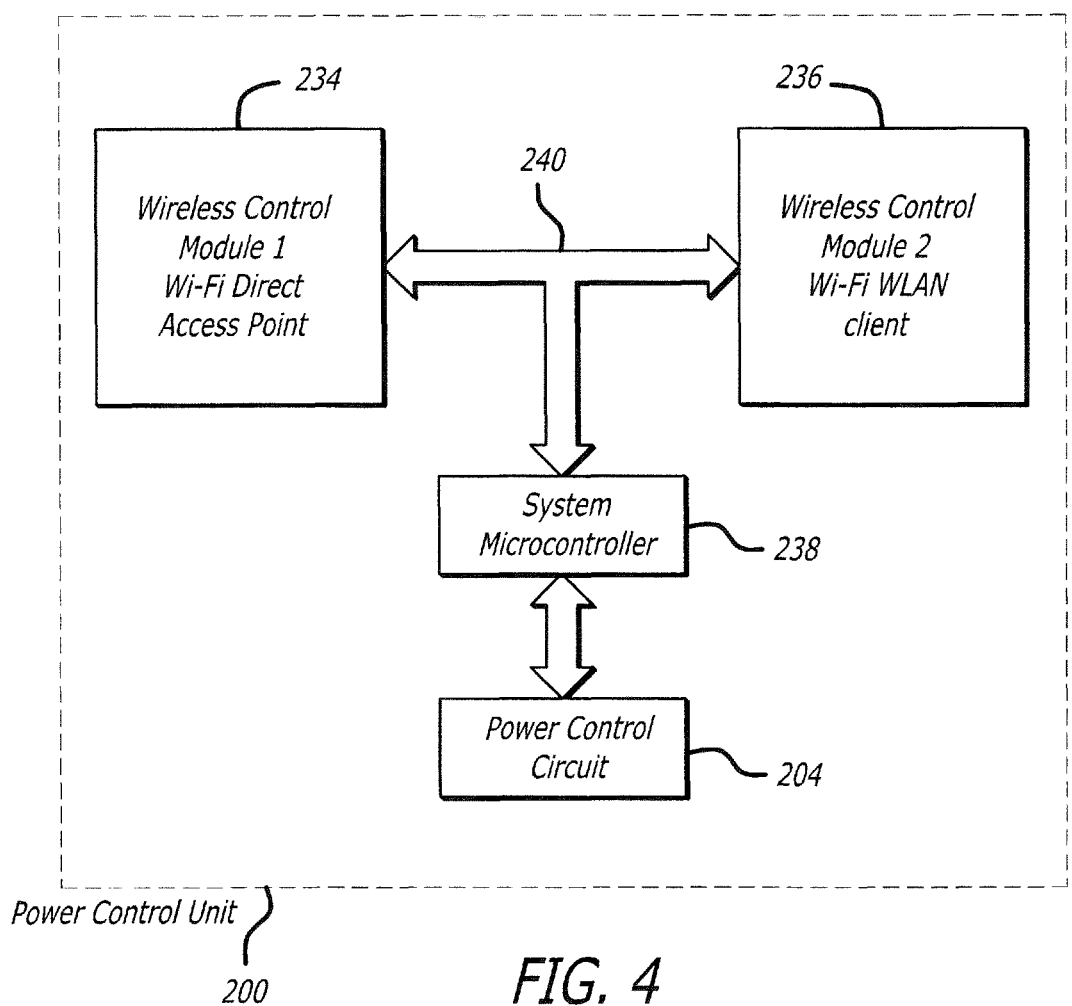
FIG. 4 is a block diagram of a Power Control Unit in accordance with another preferred embodiment of the present invention.

FIG. 4 is the block diagram of a dual mode, concurrent connection Power Control Unit 200 where Wireless Subsystem 234 is configured to be a Wi-Fi Direct access point/group participant and Wireless Subsystem 236 is configured to be a Wi-Fi WLAN client. Each wireless subsystem preferably includes a Wi-Fi Control Module such as Wi-Fi Control Module 102 described above, and associated Wi-Fi Control Firmware for the particular configuration.

Wireless Subsystems 234 and 236 preferably meet the IEEE 802.11 specifications for Wi-Fi interworking for their particular configurations and would preferably be configured as the factory default settings.

System Microcontroller 238 communicates with each Wireless Subsystem via electrical connections 240 which preferably function as an SPI bus and provide individual data transfer and/or exchanges at high data rates. It will be appreciated that other data transfer arrangements may be used instead of connections 240 without departing from the scope of the invention. In a preferred embodiment of the present invention, System Microcontroller 238 is the system master device and via its firmware control program, it oversees the functional operations of both Wireless Subsystems 234, 236 and Power Control Circuits 204.

As noted above, Power Control Circuits 204 are not the primary focus of this embodiment of the invention and a detailed description of the function and operation of Power Control Circuits 204 is not required.

When the Power Control Unit is manufactured, packaged and ready for delivery to an end user, the firmware control program in the Non-volatile Memory of each Wireless Subsystem preferably conforms to the task it will perform in the Power Control Unit. The firmware of Wireless Subsystem 234 may configure its Wi-Fi Control Module to conform to the Wi-Fi Alliance's Wi-Fi Direct specification for access point/group participant application. The firmware of Wireless Subsystem 236 may configure its Wi-Fi Control Module to conform to the Wi-Fi Alliance's Wi-Fi WLAN specification for client applications.

When mains power is applied to the Power Control Unit, preferably both Wireless Subsystems load their firmware control programs from their respective Non-volatile Memory and then power down to a sleep mode until commanded by System Microcontroller 238 to execute a function.

For the purposes of this example it is assumed Wireless Subsystems 234 and 236 incorporate a Wi-Fi Control Module such as Wi-Fi Control Module 102 shown in FIG. 2. Except as already noted, each Wireless Subsystem is preferably identical and supports SPI bus 240 for communication with System Microcontroller 238. System Microcontroller 238 is the master SPI bus device and is able to control the functions of Wireless Subsystems 234 and 236 selectively and individually using the SPI bus slave select control. FIG. 7, by way of example, shows a typical "power up" sequence.

Referring to FIG. 7, a method 500 for powering-up Power Control Unit 200 is shown and described. In step 502, mains power is applied to the Power Control Unit. In step 504, the first wireless control module loads the Wi-Fi Direct application firmware from is non-volatile memory to its SoC microcontroller program/data RAM. In step 506, the second wireless control module loads the Wi-Fi application firmware from is non-volatile memory to its SoC microcontroller program/data RAM. In step 508, the first wireless control module configures itself as a Wi-Fi Direct access point/group participant and then powers down to "sleep" mode. In step 510, the second wireless control module configures itself as a Wi-Fi Direct access point/group participant and then powers down to "sleep" mode. In step 512, the system microcontroller runs a control program from its own non-volatile memory and assumes the role of Power Control Unit master. It will be appreciated that the steps described above may be performed in a different order, varied, or certain steps added or omitted entirely without departing from the scope of the present invention. It will further be appreciated that one or more steps shown in FIG. 7 may be performed simultaneously in parallel if desired.

At this point of the initialization process, the Power Control Circuits are preferably inactive because there are no pre-programmed functions in the factory defaults. The Power Control Unit initialization is started by System Microcontroller 238 as the system master. FIG. 8, by way of example, shows a typical "discovery message" sequence in Wi-Fi Direct mode.

Referring to FIG. 8, a method 600 for a typical "discovery message" sequence is shown and described. In step 602 the system microcontroller commands the first wireless control module to start searching for a user. In step 604, the first wireless control module runs its Wi-Fi radio transceiver in Wi-Fi Direct access point/group participant mode and starts transmitting discovery messages or "pings" which can be seen by a smartphone within range. In step 606, the "pings" identify the Power Control Unit as a Wi-Fi Direct access point/group participant with a generic name and ID address common to all Power Control Units when they are first powered on. In step 608, the Power Control Unit and smartphone can establish a communications link that may or may not be secured by data encryption. It will be appreciated that the steps described above may be performed in a different order, varied, or certain steps added or omitted entirely without departing from the scope of the present invention.

It can be appreciated that a Wi-Fi Control Module operating as a Wi-Fi Direct access point/group participant can communicate directly with a smartphone without the requirement of a Wi-Fi WLAN. In this case, the Wi-Fi Control Module appears as a Wi-Fi access point if the personal controller is not using Wi-Fi Direct to communicate with the Power Control Unit; or if the personal controller is using Wi-Fi Direct to communicate, negotiates between the Wi-Fi Control Module and the personal controller which of the Power Control Unit and personal controller will assume a Wi-Fi Direct group owner role and establishes a peer-to-peer connection. The user is then able to send commands directly to the selected Wi-Fi Control Module without the need for any other device. In this case, the Wi-Fi Control Module and smartphone communicate directly with each other, but only if they are within wireless range. The preferred method to do this has the user loading a related Product App. Instructions on how this is done for each smartphone operating system is preferably included with the Power Control Unit. The procedure is simple and is similar to loading any other App onto a smartphone.

When the Product App is installed and is started, it will identify the Power Control Unit as being a new device which needs to be re-configured in order to become a specific, individually selectable device.

At this point the Product App allows the user to determine if the new Power Control Unit is: (1) to remain a Wi-Fi Direct access point/group participant only; or (2) connect to a WLAN and become a Wi-Fi WLAN client only; or (3) operate as a concurrent device being simultaneously a Wi-Fi Direct access point/group participant and a Wi-Fi WLAN client.

If the user desires the new Power Control Unit to be a Wi-Fi Direct device so that communications between it and a smartphone are by a direct peer-to-peer communications link only, this is selected as the requested option on the smartphone. The Product App then leads the user through a series of data inputs using the smartphone's graphics touch screen as the input interface. The Product App also communicates with the applications program of System Microcontroller 238, which updates the general parameters used for the initial connection with the smartphone to specific parameters which define the Power Control Unit as a unique Wi-Fi Direct product. These may include: setting a unique encryption key so all data transfers between the Power Control Unit and the smartphone are protected; setting the Power Control Unit name to a unique, easily recognisable identifier, e.g., from a product name such as "Power Switch" to "Kitchen TV"; setting the Power Control Unit's unique Wi-Fi address ID so that it becomes an individual device in its own right; setting a password in the Power Control Unit used to establish a secure link with a smartphone.

The Product App preferably maintains a record of these specific parameters in the smartphone memory for future identification of, and connection to, the new specific Power Control Unit.

Once the setup procedure is completed, the Product App commands the Power Control Unit System Microcontroller 238 to restart Wireless Subsystem 234. When the restart completes, the Power Control Unit will have its own unique Wi-Fi Direct identity. The smartphone which was used to set this identity will be able to automatically connect each time the user selects that particular device because the new specific parameters are known.

Once a Power Control Unit has been configured as a specific unit, any other smartphone can also be connected, but only if the user knows the specific parameters that are now unique to that particular Power Control Unit. The procedure to connect another smartphone to the dual mode, dual channel Power Control Unit is preferably the same as for the dual mode, single channel Power Control Unit described previously.

If, instead of configuring the newly installed Power Control Unit as a Wi-Fi Direct access point/group participant, the user wishes the Power Control Unit to be a Wi-Fi WLAN client, this option is selected as the preferred choice and the Product App determines if there are one or more Wi-Fi WLANs available for the Power Control Unit to connect to as a client. The Product App requests the user to confirm the preferred network and asks the user to input the network password so the Power Control Unit can connect to the Wi-Fi WLAN as a client.

The Product App communicates with System Microcontroller 238 via the Wi-Fi Direct communications link and sets the parameters which will be needed for the Power Control Unit to establish itself as a Wi-Fi WLAN client instead of being a Wi-Fi Direct access point/group participant. When all of the appropriate parameters are known and updated, the Product App commands the Power Control Unit System Microcontroller 238 to initialize Wireless Subsystem 236 as a Wi-Fi WLAN client. This is a similar procedure to establishing the Wi-Fi Direct connection when power is applied to Power Control Unit for the first time. FIG. 9, by way of example, shows a typical "system restart" sequence.

Referring to FIG. 9, a method 700 for re-starting Power Control Unit 200 is shown and described. In step 702, the system microcontroller sets any parameters or IEEE 802.11 specifications required for the second wireless control module to operate as a Wi-Fi WLAN client. In step 704, the second wireless control module runs its Wi-Fi radio transceiver in Wi-Fi WLAN mode. In step 706, the Power Control Unit connects to the Wi-Fi WLAN as a client. In step 708, the system microcontroller confirms to the Product App that the Wi-Fi WLAN client connection is active and then commands the first wireless control module to disconnect the Wi-Fi Direct communications link and enter "sleep" mode. In step 710, all communications between the smartphone and the Power Control Unit are then made via the Wi-Fi WLAN access point. It will be appreciated that the steps described above may be performed in a different order, varied, or certain steps added or omitted entirely without departing from the scope of the present invention.

There are applications for a Power Control Unit where concurrent Wi-Fi Direct and Wi-Fi WLAN capability is desirable. In this situation, the user via the Product App can enable both Wi-Fi modes to remain active, allowing either mode to be used. Equally, the user, via the Product App, can choose to disable one of the modes, or can change the Wi-Fi mode from Wi-Fi Direct to Wi-Fi WLAN, or vice versa as desired.

Each time the Wi-Fi mode is changed, the parameters for the new mode are preferably retained by System Microcontroller 238 in the event power is disconnected or lost. When power is restored, System Microcontroller 238 powers up in the same Wi-Fi mode as previously operating before power was removed, and the appropriate operating parameters are restored from the Non-volatile Memory.

It will be envisaged that there may be times when a Power Control Unit may be moved for a different application where the particular Wi-Fi mode may not be suitable, or the original Wi-Fi WLAN may not be available. The Product App is preferably configured to communicate with a Power Control Unit and command it to re-initialise to the factory default configuration. In this case, all user-defined parameters that were loaded into the Power Control Unit are lost and when the unit is next powered up, it will be in its factory default state, ready to receive user-defined parameters.

The Power Control Unit may incorporate a mechanical means such as a button or switch which the user could activate to cause the Power Control Unit to re-initialise to the factory default configuration without the use of a smartphone or Product App.

The foregoing description is by way of example only, and may be varied considerably without departing from the scope of the present invention. For example only, the wireless control module may be configured for use with standards outside the IEEE 802.11 standards. The Power Control Unit may include only a single wireless control module, or a plurality of wireless control modules. Such wireless control modules may be integrated with the microcontroller forming part of the Power Control Unit and/or connected to the microcontroller through an interface such as a USB interface. It will be appreciated that the Power Control Unit may be configured to operate in more than two modes, whether singularly (one at a time), or simultaneously. For example only, the Power Control Unit may be configured to operate in a peer-to-peer communications mode such as Wi-Fi Direct, a non-peer-to-peer communications mode which utilizes an access point, such as Wi-Fi WLAN, or some other form of peer-to-peer mode.

Figure 10:
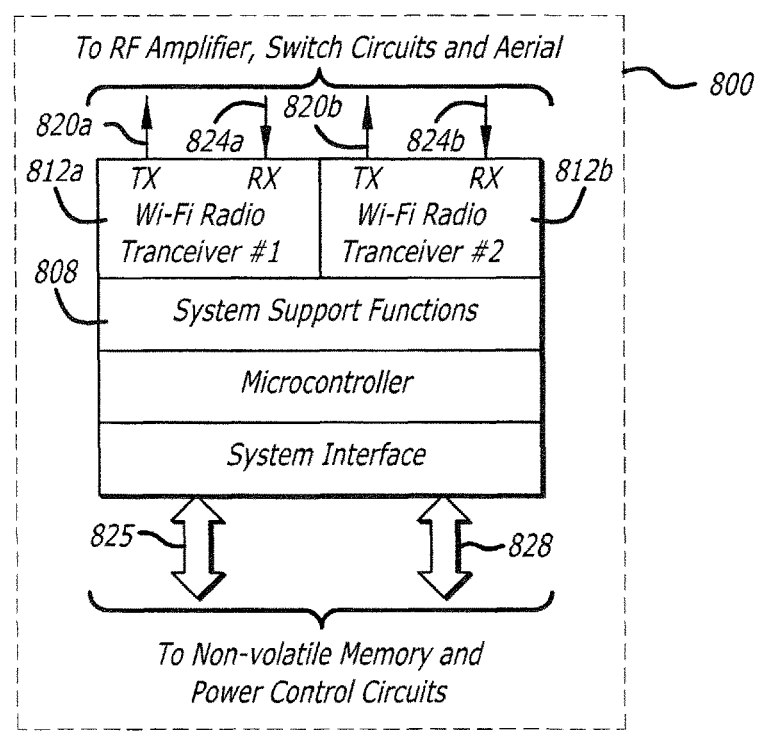
FIG. 10 is a block diagram of a dual radio Wi-Fi SoC in accordance with another preferred embodiment of the present invention.

Referring now to FIG. 10, a Power Control Unit 800 is shown in accordance with another preferred embodiment of the present invention. FIG. 10 shows that the dual mode, concurrent connection Power Control Unit may be configured to operate with a single Wi-Fi SoC, substantially simplifying the architecture of the Power Control Unit, as well as reducing its size and cost. Power Control Unit 800 is similar to Power Control Unit 100 except that it has a Wi-Fi SoC 808 that includes two Wi-Fi radio Transceivers 812*a*, 812*b*. Transmitter TX connections 820*a*, 820*b* and Receiver connections 824*a*, 824*b* connect Wi-Fi SoC 808 to the RF Amplifiers and Switching Circuits. Similarly, connections 825, 828 connect Wi-Fi SoC 808 to the Power Control Circuits and Non-volatile memory.

It will be further appreciated that a single radio Wi-Fi Control Module can provide virtual concurrent connections. Each virtual connection can be configured by the user to appear as a Wi-Fi WLAN device or a Wi-Fi Direct device, where each connection may be formed on a different physical channel if so desired. For example, Wi-Fi Control Module 102, shown in FIG. 2, may be configured with virtual concurrent connections so that Wi-Fi Control Module 102 may operate in both a peer-to-peer mode and a WLAN mode concurrently.

It will also be appreciated that references to specific modules and subsystems in the description of the invention by way of preferred embodiments does not limit the scope for integration of the component parts into a few or even a single integrated circuit as technology advances in time.

Figure 11:
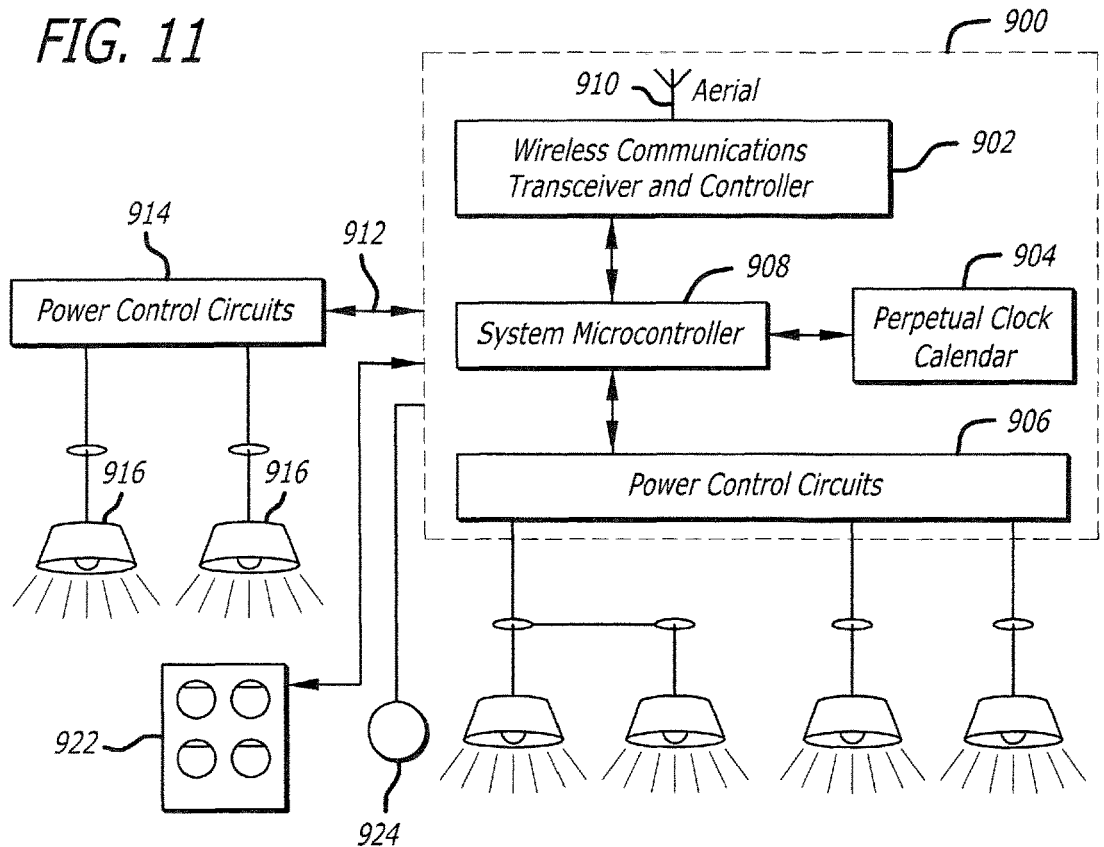
FIG. 11 is a block diagram of the functional elements of a Power Control Unit in accordance with another preferred embodiment of the present invention.
Figure 12:
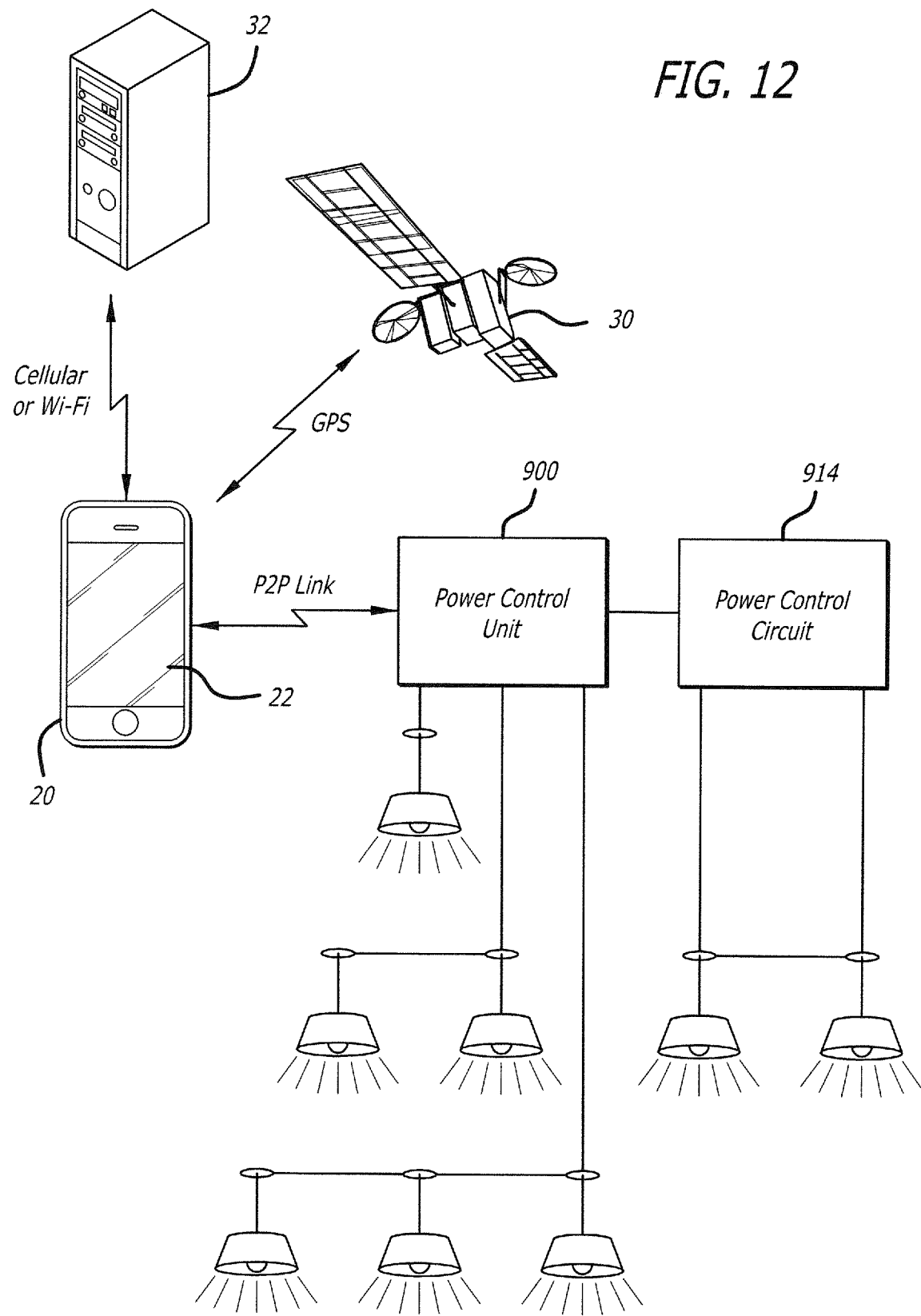
FIG. 12 is a system pictorial representation of the smartphone of FIG. 1 and its interaction with location services, remote data servers and the Power Control Unit of FIG. 11 running a plurality of lights.

Referring now to FIGS. 11 and 12, a Power Control Unit 900 is shown in accordance with another preferred embodiment of the present invention. FIG. 11 shows Power Control Unit 900 in a preferred environment. Power Control Unit 900 has a wireless communications transceiver and controller 902, perpetual clock calendar 904, power control circuits 906, system microcontroller with embedded memory 908, and an aerial 910. Perpetual clock calendar 904 preferably includes a battery backup enabling real time to be accurately calculated even in instances where a mains power outage occurs.

The commands and responses between system microcontroller 908 and the smartphone are communicated through a radio frequency wireless link supported by wireless communications transceiver and controller 902 and aerial 910. Depending on cost and the desired operational functions, wireless communications transceiver and controller 902 may include only a Wi-Fi radio, only a Bluetooth radio, only a NFC radio or combination of those technologies. The Product App may communicate with any mix of power controlling elements and radio technologies which seamlessly provide the best communications link as the user moves through a controlled space. This would allow a controlled space to be restricted to an approximate small radius from the controller or a large radius which provides increased flexibility for the user in the way the user configures and uses a preferred embodiment of the present invention.

When the wireless communications transceiver and controller 902 operates according to the Wi-Fi Direct specification, it can communicate with devices that support Wi-Fi WLAN or Wi-Fi Direct on a peer-to-peer basis without the need for any intermediary hardware. Wireless communications transceiver and controller 902 is preferably configured to operate according to the Wi-Fi Direct specification as both a Wi-Fi Direct group participant and Wi-Fi Direct access point, allowing the power control unit to appear to Wi-Fi WLAN devices during discovery as a Wi-Fi access point. After being discovered as a Wi-Fi Direct access point, a Wi-Fi Direct device is able to communicate peer-to-peer with Wi-Fi WLAN devices that support the IEEE 802.11 specification as amended from time to time. In this instance, a Wi-Fi WLAN device will receive a device discovery message from the power control unit as if from a Wi-Fi access point and be able to establish a communications link with a smartphone if the right is granted by the power control unit. The intricacies of establishing the communications link between a Wi-Fi Direct device and Wi-Fi WLAN devices are defined in the Wi-Fi Alliance specifications and would be understood by practitioners skilled in communications systems protocols.

Wi-Fi Direct has a number of advantages which simplify communications between a Power Control Unit and a smartphone operating as a controller. Significant advantages include mobility and portability, where a smartphone and the Power Control Unit only need to be within radio range of each other to establish a wireless communications link. Wi-Fi Direct also offers secure communications using Wi-Fi Protected Access protocols and encryption for transported messages, ensuring the system remains secure to qualified devices. Most importantly, Wi-Fi Direct allows a smartphone with only Wi-Fi WLAN to engage in peer-to-peer data exchange with the power control unit even though the smartphone Wi-Fi WLAN was never intended to support on-demand peer-to-peer communications.

As smartphones continue to evolve, new models are starting to include Wi-Fi Direct support in addition to Wi-Fi WLAN. In one preferred embodiment of the present invention, where a Power Control Unit receives a Wi-Fi Direct response to a device discovery message, the smartphone and Power Control Unit will negotiate which device will be the group owner in accordance with the Wi-Fi Alliance Wi-Fi Direct specification, as amended from time to time, and a 1:1 or peer-to-peer Wi-Fi Direct communication link will be established. The Wi-Fi Direct specification allows any Wi-Fi Direct device to be a group owner, and depending on the capabilities of the device, the negotiation procedure determines the most suitable device to perform this role.

System microcontroller 908 preferably incorporates a firmware program which defines the operation and functions of the Power Control Unit and assumes responsibility for running all program code and system elements, including specifying the operation of wireless communications transceiver and controller 902, interrogation of the perpetual clock calendar 904 and operation of power control circuits 906. System microcontroller preferably includes non-volatile memory to store any program data received from the Product App.

In one preferred embodiment, power control circuits 906 may include a single relay configured to vary the supply of power to attached lights in a simple on/off fashion. In another preferred embodiment, power control circuits 906 may include a number of relays configured to vary the supply of power to different lights or banks of lights in a simple on/off fashion. In another preferred embodiment, power control circuits 906 may include a dimmer control. The dimmer control is used to vary the amount of power transferred to attached lights which have the appropriate characteristics to allow the light output to be varied anywhere from fully on to fully off as directed by system microcontroller 908.

A preferred function of the dimmer is to control the amount of light emitted by a connected individual light or bank of lights. Using a dimmer in power control circuits 906 under the control of system microcontroller 908, the amount of electrical power transferred to the attached light is regulated. Because the electrical load presented to the dimmer control can be resistive, inductive or capacitive depending on the light type and arrangement, the dimmer unit can provide both leading edge and trailing edge dimming.

System microcontroller 908 preferably has the ability to communicate with external power control circuits 914 via a communications link 912, which in a preferred embodiment, is a hardware interface. External power control circuits 914 preferably perform the same type of functions as power control circuit 906, except being external to power control unit 900, allowing an installer to add as many external power control circuits 914 as may be required to control the lighting needs of any particular installation without being limited by the number of lights supported by embedded power control circuits 906. Power control circuits 914 may also have different capabilities to power control circuits 906. Power control circuits 914 may include a number of relays configured to vary the supply of power to different lights or banks of lights 916 in a simple on/off fashion. In another preferred embodiment, power control circuits 914 may include a dimmer control and adjust the light output anywhere from fully on to fully off as directed by system microcontroller 908. System microcontroller 908 preferably has the ability to automatically interrogate power control circuits 914 for capabilities in order to present appropriate controls for the user in the Product App. If system microcontroller is unable to automatically determine power control circuits 914 capabilities, the Product App will preferably allow the user to manually enter power control circuits 914 capabilities so that the Product App will only expose controls corresponding with the capabilities of power control circuits 914.

Power control unit 900 preferably has the ability to support an external control panel 922 that interfaces with system microcontroller 908, allowing a user to manually control functions including overriding any program running on power control unit 900. External control panel 922 may also be used by the user to start any program stored in the Power Control Unit. These settings are provided by way of example only. It can be appreciated that other switch configurations and functions may be supported without departing from the scope of the present invention. In one preferred embodiment, it may be desirable to have no exposed human interface in order to reduce the incidence of vandalism or create a highly weather resistant unit.

Power Control Unit 900 preferably has the ability to accept data from external sensors 924 that system microcontroller 908 can use to determined if programmed thresholds have been met in order to execute a command or commands. By way of example only, external sensor 924 could be a sensor measuring ambient light, the level of which system microcontroller 908 could use as a threshold for causing power control circuits 906 to turn on and off a bank of lights.

It will be appreciated that the system described above can be extended in many ways without departing from the scope of the present invention. Power control circuits 914 may be configured to control an external device such as a blind, shutters, gate or door rather than lights, allowing power control unit 900 to manage other external devices according to a programmed schedule.

Communications link 912 may preferably be performed by a wireless link such as sub-1 GHz radio rather than hardware interface. Such extension would require the addition of a supporting radio that may be a transmitter only, or a transmitter and receiver, depending on power control circuits 914 requirements. Supporting radio may be configured by system microcontroller 908 to operate at a number of different carrier frequencies. Data could be modulated onto those carrier frequencies such that the encoded data could be received, decoded and acted upon by a compatible radio receiver in a remote power control circuit to operate lights or a device such as, for example only, a garage door opener, alarm system, boom gate and/or blind system.

Supporting radio may be capable of FSK, GFSK, MSK, OOK or other modulation methods and be able to operate over a wide frequency range including the license free Industrial Scientific and Medical (ISM) frequencies, or may support specific proprietary standards such as Zigbee, Z-wave or equivalents. While these specifications are applicable to most wireless sensor networks, home and building automation, alarm and security systems and industrial monitoring and control, there may be applications where a system compatible transceiver with specific frequency and modulation specifications is required. In these situations, a specific supporting radio could be provided within the embodiment described herein.

In one preferred embodiment, power control unit 900 may not contain any embedded power control circuits and interface entirely with external power control circuits allowing for a custom number of circuits with, or without, their own dimming capabilities to be installed to meet the particular requirements of the application at hand.

FIG. 12 shows smartphone 20 determining its location via a GPS satellite 30, accessing remote data server 32 and communicating with power control unit 900 in order to configure and transfer a program for automating a plurality of lights. Referring to FIG. 11, system microcontroller 908 preferably incorporates firmware which defines the operation and functions of the power control unit. When power is applied to the system microcontroller for the first time, it preferably ensures power control circuits 906 and power control circuits 914 are open and no power is sent to the attached lights or device. System microcontroller 908 then activates wireless communications transceiver and controller 902 and attempts to communicate with nearby smartphones.

Referring to FIGS. 11 and 12, when the user touches the Product App icon on touch sensitive graphical screen 22 of smartphone 20, the smartphone's operating system starts the Product App. The Product App activates the wireless communications transceiver and control of smartphone 20, which requests the status of any power control units in wireless range. Power control unit 900 responds with a message to smartphone 20 that includes the type of the power control unit. One option during the pairing process is to allocate a name to the power control unit so it can be easily identified by the user. This is particularly useful for more complex arrangements where multiple power control units are present.

Prior to being able to communicate with each other, smartphone 20 and power control unit 900 are paired preferably using the Wi-Fi Direct access point or group participant pairing procedure according to specifications outlined by the Wi-Fi Alliance. This only needs to be done once and then each time smartphone 20 is within wireless range of power control unit 900, smartphone 20 can initiate a dialog using the exchange of serial data commands and responses. Accordingly, smartphone 20 can send commands to power control unit 900 which, under the control of system microcontroller 908 and its firmware, will execute those commands.

Smartphone 20 may be configured to setup a wireless link with a paired power control unit 900, but the program data which causes power control unit 900 to execute one or more of its functions is preferably generated by the Product App. The Product App preferably determines the commands and responses smartphone 20 exchanges with power control unit 900.

The Product App is activated and controlled by the user through the smartphone's touch sensitive graphics screen 22. The Product App may be preloaded on a specific device, or could be downloaded from an appropriate server through a wireless network, Internet and/or computer. The Product App is preferably designed to translate a user's requests inputted by the user via the smartphone's graphics screen 22 into specific commands that are transferred to the power control unit 900 through the transmitter of smartphone 20 to wireless communications and transceiver control 902 of the power control unit.

The Product App preferably presents its control interface as a combination of graphics and text on graphics screen 22. Graphics screen 22 is also preferably touch-sensitive, allowing the Product App to present a graphical picture of options to the user and then determine which of the options the user wants by determining how and where the user responds by touching the graphics screen. Typically the Product App will be activated by the user touching an icon on the graphics screen. The operating system will preferably load the Product App as the current operating app so the user can proceed with instructions to the paired power control unit.

An important consideration in using touch sensitive graphics screen 22 as the interface between the smartphone and the user is the ease that the graphical presentation can be changed for different languages. While the icon images may remain the same, the graphical interface allows the text of, for example, an alphabetic language such as English to be replaced with, for example, a pictorial language such as Japanese by changing the graphics displayed on the graphics screen. The underlying functions represented on the screen preferably respond to the user's selection by touch irrespective of the language used for the display.

The Product App's preferred primary role is as an interface for users to program or modify lighting parameters under the control of power control unit 900 including schedule data specifying the operating times and/or dimming levels where supported by power control circuits. It can be appreciated that in many instances it may be favourable for lights to run automated according to reoccurring events. An example of this is turning a light on at a particular time each evening, most commonly dusk, and off again in the morning, most commonly at dawn. The ability to offer a generic schedule for events such as sunrise and sunset or business hours is problematic in that these times vary for each location depending on factors such as season, time zone, latitude, longitude, trading laws, religious festivals, public holidays, etc.

The Product App preferably offers users the ability to program lighting scenes with the assistance of a Default Schedule. A Default Schedule preferably includes on/off times based on specific sunset/sunrise with daylight savings correction, business hours with public holiday profiles, religious holidays, special events, other parameters specific to a particular location, or a combination thereof; having been compiled for regions and time zones around the world.

If a user chooses to work from a Default Schedule, the Product App may preferably ask the user if the lighting to be programmed is indoors, outdoors, business, business type, private, or a combination thereof in order to offer a Default Schedule most suited to the user's situation. It can be appreciated that different or additional parameters may be offered to compile a more tailored Default Schedule without departing from the spirit of the invention. It can also be appreciated that the Product App may allow for users to be charged a fee for Default Schedules.

If the user chooses to run a Default Schedule, the Product App is preferably able to access location data through an application layer in the operating system associated with the smartphone. The ability for the Product App to access location data is a feature common to all current smartphone operating systems, the mechanics of which would be understood by those skilled in the art of application development.

As shown in FIG. 12, location capability of Smartphone 20 is preferably able to determine its global position through GPS using satellite 30. Because location data is typically a core service of smartphone operating systems, the present invention is not limited to using GPS and can equally accept location data from other technologies the smartphone may be using such as, by way of example only, assisted GPS, synthetic GPS, cell ID, inertial sensors, Bluetooth beacons, terrestrial transmitters, or geomagnetic field techniques. If for some reason the Product App is unable to fix a global position from the smartphone location capability, the user may manually enter location into the Product App using the touch screen interface.

Once the Product App has preferably determined its global location from the smartphone location capability or user input, it will verify if a Default Schedule is available. The Default Schedule may be pre-stored in the Product App or may be downloaded by the Product App from remote server 32. If a Default Schedule is not available for the location, the Product App will preferably offer the user the next closest location for which a Default Schedule is available. If next closest location is not suitable for the user, the Product App will preferably allow the user to manually enter all parameters.

In the instance that a Default Schedule needs to be downloaded, the smartphone's wireless communications transceiver and control can use smartphone's cellular or Wi-Fi communications to access remote server 32 and transfer Default Schedule into the Product App.

The Product App will preferably allow for the user to customize and manipulate parameters of Default Schedule for the specific application, including scheduling and adjustment of times for a light, bank of lights, or many banks of lights either individually or as groups, and may include the ability to set dimming levels of lights individually or as groups with the possibility to have various dimming scenes over time.

During programming of lighting parameters and scheduling, smartphone 20 preferably maintains an active peer-to-peer link with power control unit 900, allowing the Product App to send commands to system microcontroller 908, causing it to adjust the power control circuits so that users can preview how adjustments in the Product App appear on the lighting in situ. The Product App preferably allows the user through the smartphone touch screen to select different time periods for which lighting events have been programmed into the Product App, with the Product App sending commands to system microcontroller 908 causing it to adjust the power control circuits for all parameters that have been programmed for that corresponding time period in order to preview a lighting scene in order to verify if any adjustments need to be made.

When the user has completed programming in the Product App, the Product App using the peer-to-peer link between smartphone 20 and the power control circuits will transfer program data to Power Control Unit 900 to be run by system microcontroller 908 in executing schedules and parameters programmed by the user in the Product App giving effect to automated lighting scenes.

Referring again to FIG. 11, because default schedules and other functions on Power Control Unit are time dependent, Power Control Unit 900 preferably includes perpetual clock calendar 904 that system microcontroller 908 uses to maintain a highly accurate internal clock calendar. Perpetual clock calendar 904 preferably includes battery power backup allowing it to continue running in case of mains power outage. On the successful establishment of a peer-to-peer communications link, system microcontroller 908 preferably requests from the Product App current clock calendar data in order to verify perpetual clock calendar 904 is operating in sync with the user's smartphone. System microcontroller 908 preferably has the ability to set perpetual clock calendar 904 current time and date based on clock calendar data from the Product App to ensure seamless synchronicity with the user's smartphone.

Figure 13:
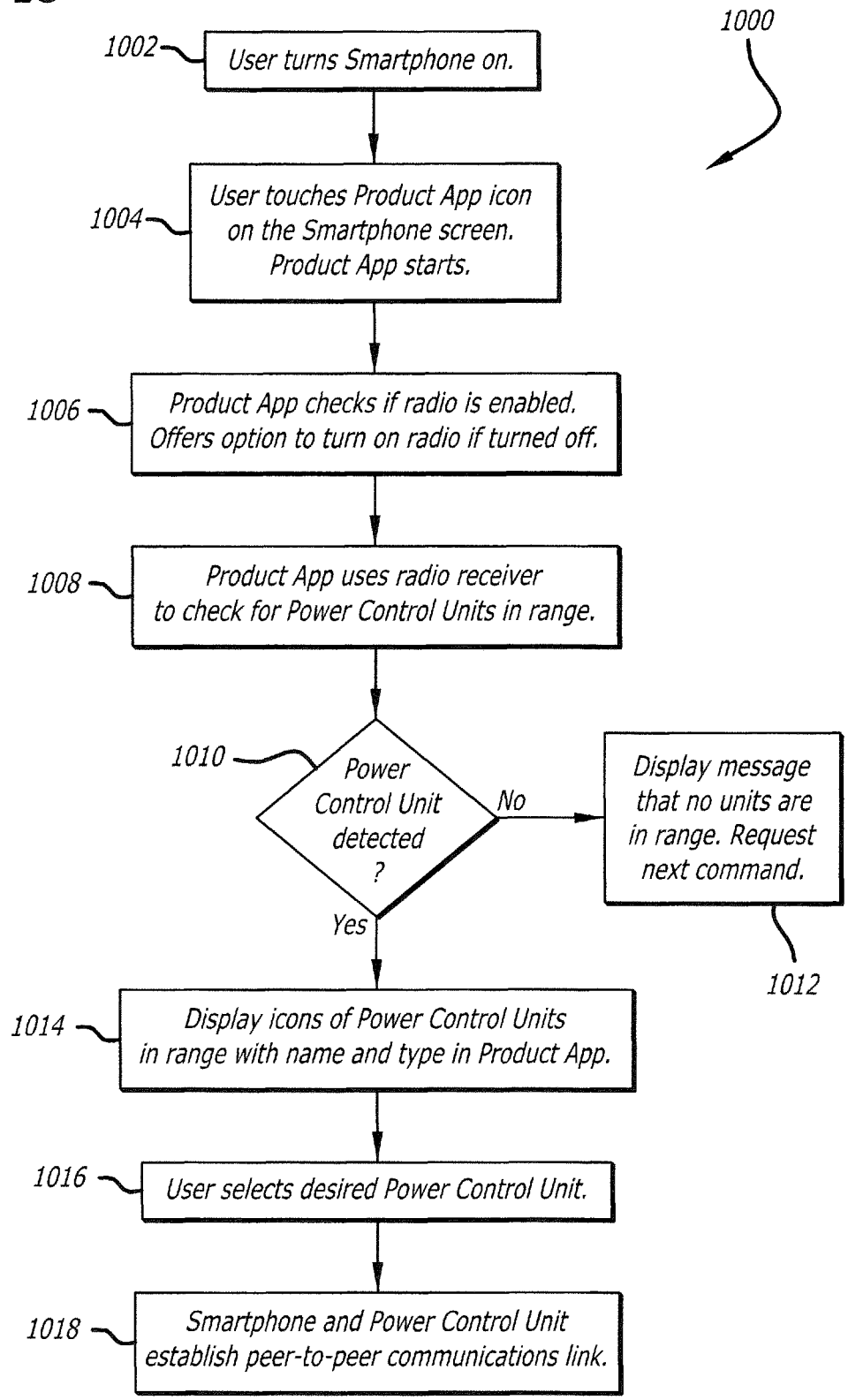
FIG. 13 is a flow diagram showing a sequence of events between a user and an applications program loadable onto the smartphone of FIG. 1 for discovery and communication with the Power Control Unit of FIG. 11.

Having described the preferred components of Power Control Unit 900, a preferred method of use will now be described with reference to FIGS. 13 and 14. FIG. 13 is a flow diagram of a method 1000 that includes actions taken by a user to discover and open communications with a Power Control Unit in accordance with the user's instructions. Such actions are preferably conveyed to a Power Control Unit by touching the available options presented by the Product App for that particular Power Control Unit. Referring to FIG. 13, in step 1002, the user switches the smartphone ON and the smartphone operating system displays a number of icons on its graphics screen. The user may have to scroll or page the display to locate the icon for the Product App depending on the smartphone operating system. Once located, in step 1004 the user touches the Product App icon and the Product App activates. In step 1006 the Product App checks to see if the radio is active and if not, requests the user to turn it on. In some implementations, the Product App may automatically turn the radio on. Once on, the Product App in step 1008 scans its radio frequencies looking for Power Control Units within wireless communications range. If in step 1010 no Power Control Unit s are detected, the Product App proceeds to step 1012 and advises the user. In step 1014, if one or more Power Control Units are detected, the Product App determines their name and type and displays this information to the user on the smartphone's graphical screen. If the user selects one of the displayed Power Control Unit's icon in step 1016, the Product App in step 1018 then displays any prerequisites for establishing a peer-to-peer communications link between the smartphone and Power Control Unit, the correct completion of which will establish a peer-to-peer link. Such prerequisites may include passwords or other security measures. If the smartphone and Power Control Unit have previously established a peer-to-peer link, protocols for establishing a new link may be automatically exchanged and a link established on the user selecting the Power Control Unit at step 1016.

It will be appreciated that the steps described above may be performed in a different order, varied, or certain steps added or omitted entirely without departing from the scope of the present invention.

Figure 14A:
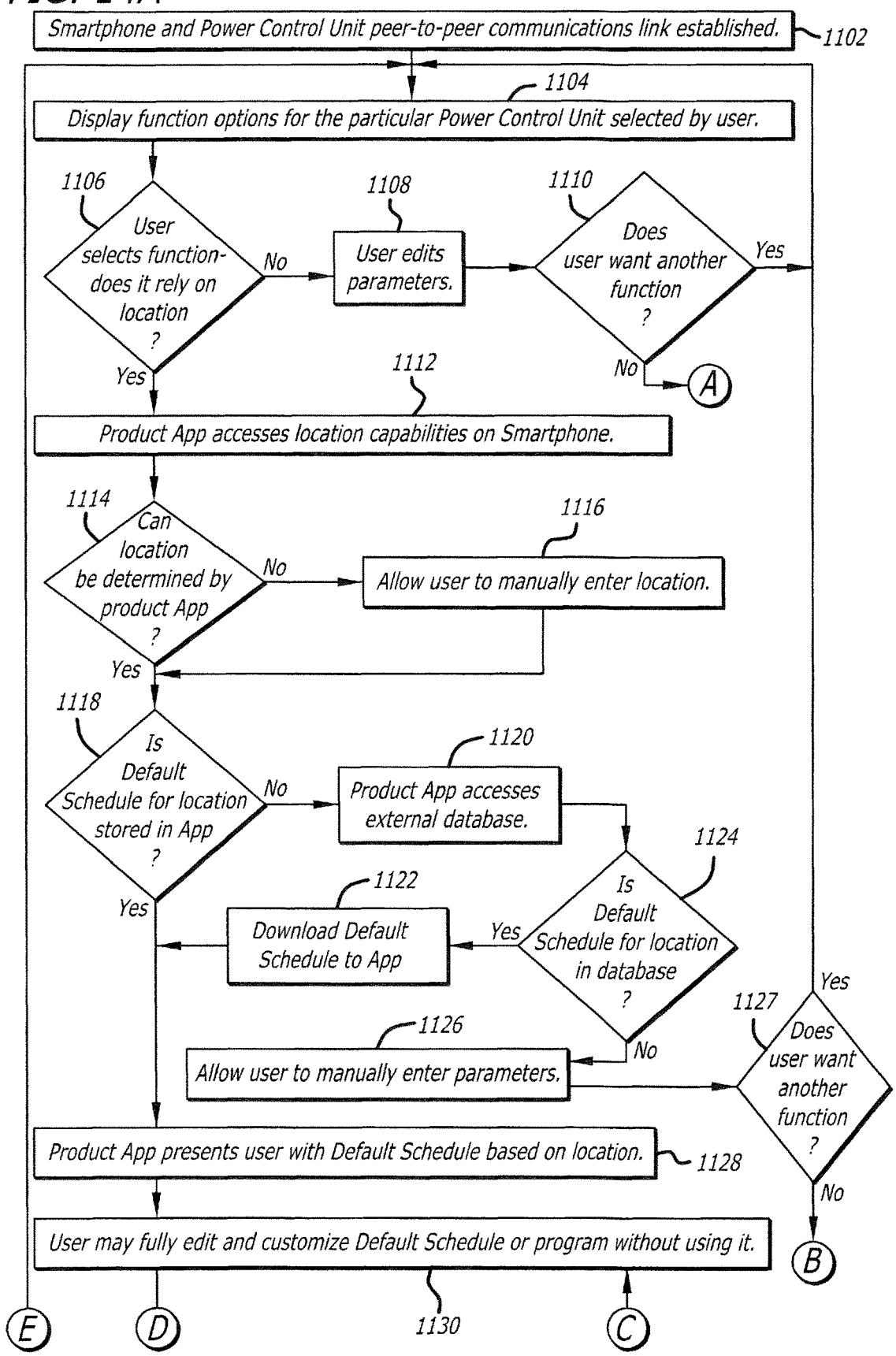
FIGS. 14A and 14B are a flow diagram showing a sequence of events between a user and an applications program loadable onto the smartphone of FIG. 1 for programming parameters into the Power Control Unit of FIG. 11.
Figure 14B:
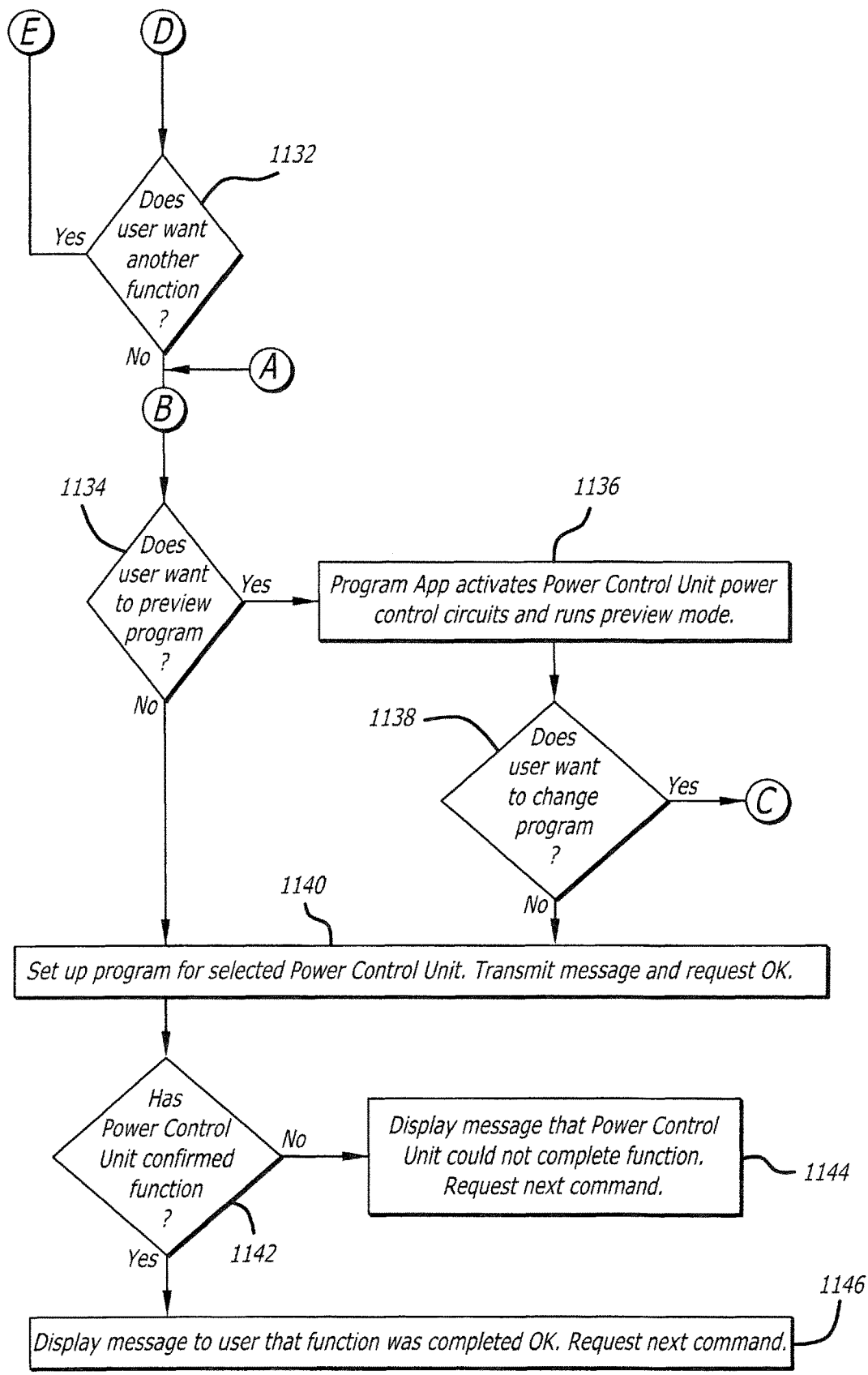

FIGS. 14A and 14B are a flow diagram of a method 1100 that includes actions, commands and responses between a user and the smartphone, and the smartphone and the Power Control Unit to program a Power Control Unit with automated lighting scenes. In one preferred embodiment, the Product App preferably dynamically stores all of the user's edits as the user progresses through each step of programming. In step 1102, smartphone and Power Control Unit establish a peer-to-peer communications link. In step 1104, Power Control Unit reports to the Product App functions that Power Control Unit is able to perform, the Product App then displaying available options to the user. In step 1106, the user through the smartphone touch screen, is able to select parameters they wish to set or edit. Selecting a particular parameter will preferably expose the controls necessary for making adjustments to that parameter on the smartphone touch screen. There may be a number of parameters defined by the Product App as location dependent in that an associated Default Schedule may be available to assist in the programming of that parameter. By way of example only, this may be the Product App offering a Default Schedule to program lighting on and off times.

If the function the user selects is not defined by the Product App as location dependent, the user will be presented with the controls necessary for making adjustments to the selected parameter on the smartphone touch screen in step 1108. By way of example only, this may be manually configuring the Product App for an external power control circuit that was not automatically detected by system microcontroller. Once the user completes adjustments to the chosen parameter, the Product App in step 1110 asks the user if they wish to perform any further tasks. If the user chooses the affirmative, the Product App will revert to the main control screen at step 1104 for the chosen Power Control Unit.

If the user selects a parameter defined by the Product App as location dependent in step 1106, the Product App will access the location capabilities on the smartphone at step 1112 to determine its global position. In step 1114, the Product App will ascertain if it can determine its global position from the smartphone location capabilities. If the Product App cannot determine its global position, or if the current position is unknown, the Product App at step 1116 will preferably allow the user to manually enter their current location or manually choose from a list of the next closest locations for which Default Schedule data is available.

If the user's location can be determined by the Product App at step 1114, or if the user has manually entered a location, at step 1116 the Product App may ask the user to confirm a number of parameters on how lighting is being used and will check to see if a Default Schedule is available for the user's global position and application in the Product App database stored locally on the smartphone. Examples of parameters that might be asked of the user could include if lighting is installed in a retail, domestic, commercial, internal or external environment, or any combination thereof. If a Default Schedule is not available in the Product App database stored locally on the smartphone, at step 1120 the Product App will access an external database stored on a remote server using either the smartphone cellular or Wi-Fi communications and at step 1124 will search for a Default Schedule for the user's global position and application. If a Default Schedule cannot be found for the user's global position and application at step 1124, the Product App will report this to the user at step 1126 and allow them to manually enter parameters. When the user has finished with parameter changes at step 1126, the Product App in step 1127 will ask the user if they wish to perform any further tasks. If the user chooses the affirmative, the Product App will revert to the main control screen at step 1104 for the chosen Power Control Unit. If the user does not have any further tasks they wish to perform, the Product App at step 1134 will preferably ask the user if they wish to preview what they have programmed.

If a Default Schedule for the user's global position is found at step 1118 or step 1124, the Product App will present the user with the Default Schedule parameters on the smartphone touch screen at step 1128. At step 1130, the user preferably has the ability to accept the Default Schedule as presented, deeply edit the Default Schedule according to their requirements, or choose to continue programming without using the Default Schedule.

When the user has finished with parameter changes at step 1130, the Product App in step 1132 will ask the user if they wish to perform any further tasks. If the user chooses the affirmative, the Product App will revert to the main control screen at step 1104 for the chosen Power Control Unit. If the user does not have any further tasks they wish to perform, the Product App at step 1134 will preferably ask the user if they wish to preview what they have programmed. The Product App will similarly move to step 1134 where the user doesn't have any further tasks they wish to perform at step 1110.

Referring to FIGS. 11 and 14B, if the user chooses to preview what they have programmed, the Product App preferably enters preview mode at step 1136 and uses open peer-to-peer communications link with Power Control Unit 900 to directly control system microcontroller 908 in adjusting lighting to replicate a scene as it would appear at the particular time chosen by the user to preview, allowing the user to verify all parameters as though the program was running on Power Control Unit 900. The Product App controlling the system microcontroller could also preferably replicate changes in lighting scenes over time by allowing a user to preview lighting scenes between a start and finish time, with the Product App causing system micro controller 908 to change all parameters in faster than real time to allow the user to preview a scene in a fast forward format and verify parameters change as expected. At step 1138, the user is preferably asked by the Product App if they wish to make any changes to the programming. If the user selects the affirmative, they are taken to step 1130 where parameters of the Default Schedule can be edited. It will be appreciated that user at this stage may also wish to change parameters not related to a Default Schedule, in which case the user is also preferably given the option to go to step 1104 in order to modify any parameter associated with Power Control Unit 900.

If the user does not want to preview the program at step 1134, or if the user does not wish to make any program changes after previewing at step 1138, at step 1140 the Product App will compile the programming of the user and attempt to transmit program data to Power Control Unit via peer-to-peer communications link between smartphone 20 and Power Control Unit 900. The Product App will request from Power Control Unit confirmation that program data has been received.

At step 1142, the Product App preferably analyses the Power Control Unit's response to the Product App's attempt to transmit program data. At step 1144, if Power Control Unit does not confirm successful receipt of program data, the Product App will display a message that transfer could not be completed and await further direction from the user. At step 1146, if Power Control Unit 400 confirms successful receipt of program data, the Product App will display a message that the transfer was completed and await further direction from the user.

It will be appreciated that the steps described above may be performed in a different order, varied, or certain steps added or omitted entirely without departing from the scope of the present invention.

Figure 15A:
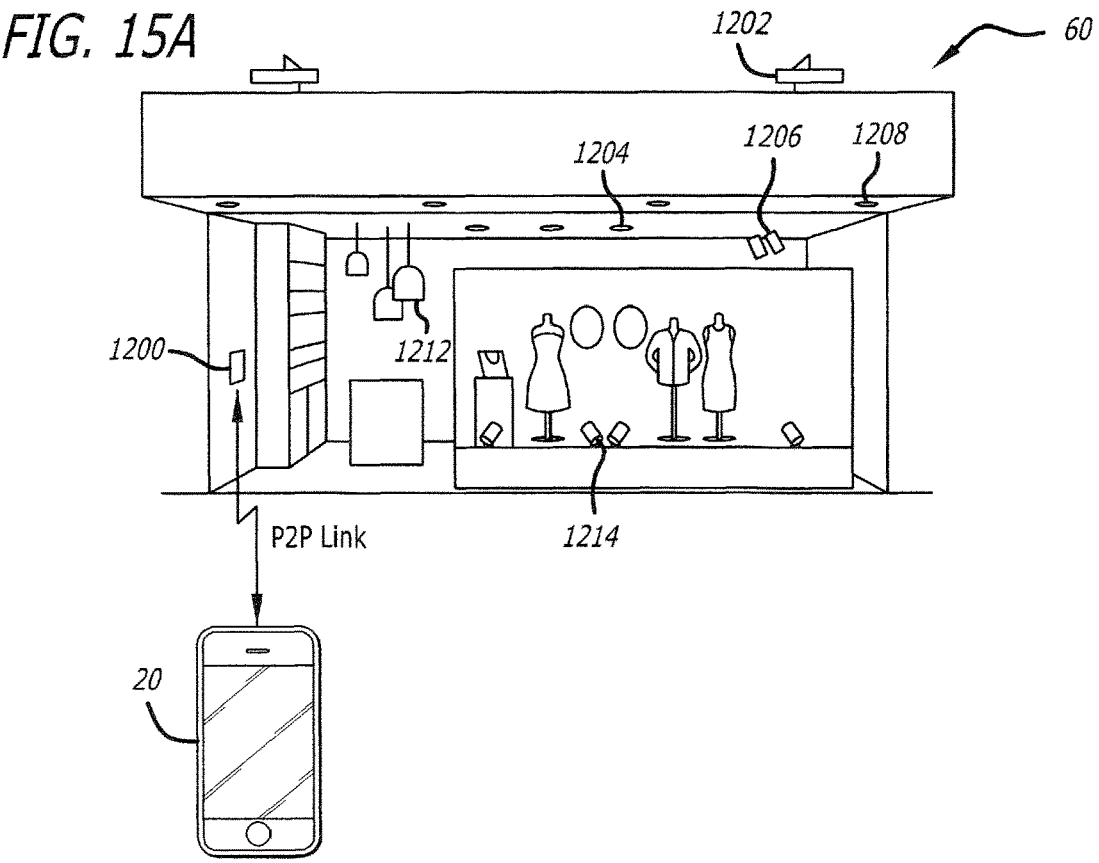
FIG. 15A is a pictorial representation of the product app running in preview mode on smartphone of FIG. 1 using a peer-to-peer communications link with the Power Control Unit of FIG. 11 to control retail lights in accordance with one preferred embodiment of the invention.
Figure 15B:
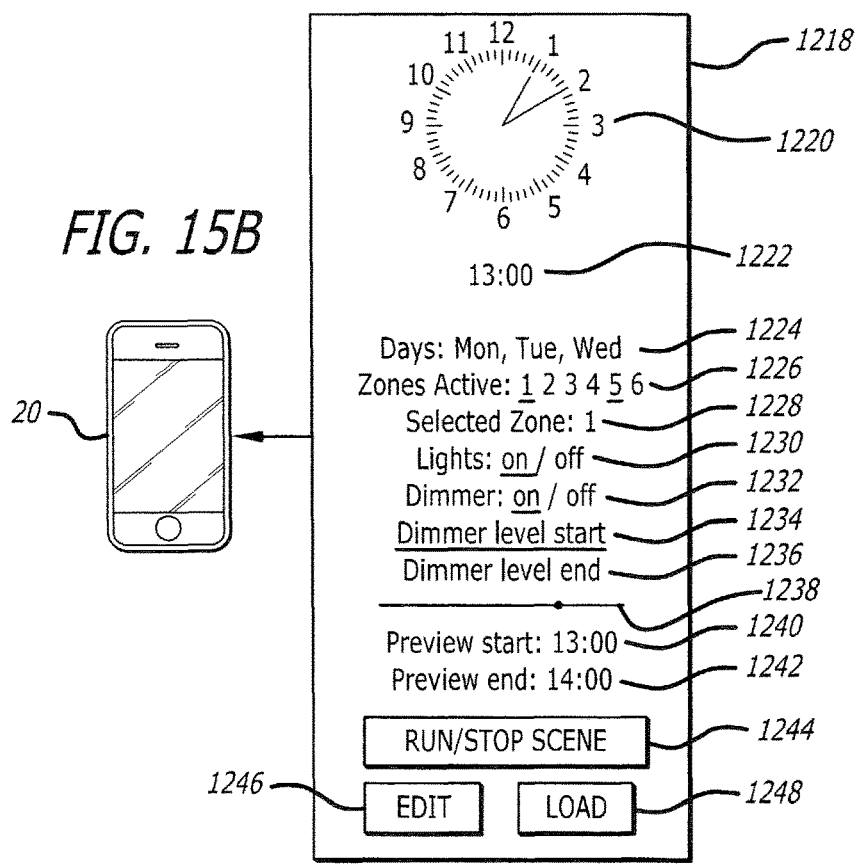
FIG. 15B is an expanded view of a screen shot of the screen of the smartphone of FIG. 15A.

Referring now to FIGS. 15A and 15B, a Power Control Unit 1200 is shown in accordance with another preferred embodiment of the present invention. FIG. 15A shows Power Control Unit 1200 being used in a retail environment to demonstrate the interaction between different preferred aspects of the invention. It can be appreciated that the automation of lighting in retail shop 60 could be both convenient and offer power savings by efficiently controlling lights according to the time of day and trading hours. By way of example only, retail shop 60 is located on a public street rather than inside a shopping mall and is accordingly exposed to daylight. Retail shop 60 has exterior banner lighting 1202, main interior lights 1204, interior spotlights 1206, exterior facia lights 1208, interior feature lights 1212 and front display lights 1214 for six total lighting zones connected to Power Control Unit 1200 that has power control circuits suited to running all six zones independently.

In scheduling scenes for each of the six lighting zones, three variables should be considered. The first variable is opening or business hours that affect the scheduling of internal lights such as main interior lights 1204, interior spotlights 1206 and interior feature lights 1212. As used herein, "business hours" are those hours during the day that a business entity operates a location with a majority of its employees based at that location being present, or is open to the general public. The second variable is the impact of natural daylight that typically affects the scheduling of external lights such as exterior banner lighting 1202 and exterior facia lights 1208. There are also applications where the scheduling of lighting, such as front display lights 1214, may be equally affected by both opening hours and daylight. A third possible variable is the application of dimmer settings in those cases where adjusting the lighting level is advantageous or desired.

A flow of exemplary actions, commands and response between a user and the smartphone and smartphone and the Power Control Unit being used in conjunction with a plurality of lights, may take the following form. Smartphone 20 establishes a peer-to-peer link with Power Control Unit 1200. The Product App interrogates Power Control Unit 1200 for functional capabilities and number of power control circuits, thereby defining the number and type of individual zones. The user in the Product App has the ability to manually enter the number of lighting zones and/or define zone capabilities.

User through the Product App may choose to program on/off times for exterior banner lighting 1202 and exterior facia lights 1208 as a group, thereby applying the same scheduling to both zones. The Product App, having defined the programming of on/off times as a location dependent parameter, asks the user if they would like to use a Default Schedule for exterior banner lighting 1202 and exterior facia lights 1208. If the user chooses the affirmative, the Product App may ask the user to define if the lights are being used for an interior or exterior application. If the user chooses exterior option, the Product App accesses location services on smartphone 20, determines its global position, confirms that a Default Schedule for the global position and application is already stored locally in the Product App database and loads a Default Schedule of on/off times corresponding to actual sunrise and sunset times for the global position including seasonal and daylight saving adjustments. For example only, the user accepts the Default Schedule without wishing to make any edits. It can be appreciated complex automation programming for the outside lights that track actual sunrise and sunset times can be compiled in a few simple steps using a smartphone.

The user through the Product App chooses to program on/off times for main interior lights 1204, interior spotlights 1206 and interior feature lights 1212, again as a group, thereby applying preferably the same scheduling to all zones. The Product App, having defined the programming of on/off times as a location dependent parameter, asks the user if they would like to use a Default Schedule for main interior lights 1204, interior spotlights 1206 and interior feature lights 1212. If the user chooses the affirmative, the Product App may ask the user to define if the lights are being used for an interior or exterior application. Where the user chooses interior option, the Product App, knowing that interior lights may be used in commercial, retail or domestic applications, may further ask the user to define the type of use. Where the user selects retail, the Product App accesses location services on smartphone 20, determines its global position, confirms that a Default Schedule for the global position and interior retail application is already stored locally in the Product App database and loads a Default Schedule of on/off times corresponding to actual retail opening hours for the global position including holiday, seasonal and daylight saving adjustments. The user may optionally decide to edit Default Schedule to adjust operating time of lights for a number of public holidays. It can be appreciated that in only a few simple steps, complex programming for the interior lights that track actual retail hours can be quickly compiled and edited.

The user, through the Product App, may program on/off times for front display lights 1214. The Product App, having defined the programming of on/off times as a location dependent parameter, asks the user if they would like to use a Default Schedule for front display lights 1214. By way of example only, the user chooses to manually program times. Front display lights 1214 may include dimmer capability. For any light with dimmer capability, the user would preferably be able to set dimmer level in the Product App including a start time for the dimmer with a corresponding level, and an end time for the dimmer with an equal or different level. Where dimmer level at the start differed to the dimmer level at the end, Power Control Unit 1200 would preferably adjust the dimming level incrementally over the selected time period to vary from the starting level to the end level.

Referring to FIG. 15B, after user finishes editing all parameters, the user may choose to enter preview mode. In preview mode, the Product App preferably displays a screen that visually shows the user a selection of core parameters and the status of those parameters for various zones. By way of example only, the Product App screen 1218 shows preview mode display having a clock 1220, counter 1222, days to be previewed 1224, active zones 1226, selected zone 1228, light setting for selected zone 1230, dimmer status for selected zone 1232, dimmer starting level for selected zone 1234, dimmer ending level for selected zone 1236, dimmer level bar for start or ending as selected 1238, preview start time selector 1240, preview end time selector 1242, preview run/stop button 1244, edit button 1246, and load button 1248.

Preferably, the preview screen provides a concise graphical user interface of parameters and their status. The user, preferably through the smartphone touch screen, is able to set the period they wish the preview to start in preview start time selector 1240. The user selects the period they wish the preview to end in the preview end time selector 1242. This defines the preview period that is then represented graphically in clock 1220. At this stage the Product App preferably runs a comparative analysis on the user's programming to see if different scenes have been set for different days of the week in the chosen preview period. In the instance that user has compiled different scenes for different days of the week, the preview screen will preferably offer the user the ability to select from different groupings of days that share common programming via the days to be previewed section 1224.

After preview period has been defined, the Product App preferably displays parameters for the start of the preview period including updating counter 1222 to the start time of the preview period. Active zones 1226 shows all zones associated with a power control unit, highlighting those zones that are active at the start of the preview period. The user, by touching selected zone 1228 parameter, can choose a particular zone, or group of zones where those zones share common programming, to see active parameters and dynamically adjust light setting 1230 for the selected zone, dimmer status 1232 for selected zone, dimmer starting level 1234 for selected zone, dimmer ending level 1236 for selected zone, and dimmer level bar 1238 for start or ending as selected during the preview period. For those zones that do not have dimmer capabilities, the Product App will preferably set the dimmer to "off" in dimmer status 1232 for the selected zone and not allow it to activate.

The user starts preview period by touching run/stop button 1244. When the preview starts, the Product App, preferably using a peer-to-peer link with power control unit 1200, causes the power control circuits to operate faster than real time under the control of the Product App in accordance with the parameters programmed for those times selected by the user as the preview period. Counter 1222 will run faster than real time to provide a highly accurate reference for the time at which events occur. The user may optionally touch counter 1222 and manually enter a time, causing the preview mode to jump to that time and update all parameters on screen accordingly. The user can pause the preview at any stage by touching run/stop button 1244 while the preview is running. It will be appreciated that transport controls may be included that are similar to a DVD player with icons and capabilities for play/pause, rewind and fast forward, allowing users to control the running of the preview period in a familiar fashion.

During the preview it may become apparent to the user that deeper editing may be required than the exposed preview mode controls offer. Edit button 1246 allows the user to terminate the preview mode and returns the user to the main control screen for power control unit 1200 in order to edit any parameter. After the user has finished checking a specific preview period, they can define a new preview period in order to check multiple scenes in preview mode.

If the user is satisfied with all parameters, pressing load button 1248 will cause the Product App to compile all programming data and transfer this using the peer-to-peer link to power control unit 1200 where the program will then be able to run locally without any interaction with the smartphone or the Product App.

If at any stage the power control unit fails to perform any functions as expected, the user could preferably through the Product App cause the power control unit to run a self diagnostic and report any errors or issues back to the Product App for the user to review. The Product App could preferably prepare a report for transmission to an external party for the purposes of providing technical support directly from the Product App or by using email, short message service, or any other communications method supported by the smartphone.

It will be appreciated that the steps described above may be performed in a different order, varied, or certain steps added or omitted entirely without departing from the scope of the present invention.

It will be appreciated that the personal controller may be omitted by incorporating certain control and program functions directly into a microprocessor that is integrated with the wiring of the building. Where a personal controller is used, instead of, or in addition to a graphical user interface, the personal controller may be configured with a voice-activated system that inputs data according to the voice commands of the user. The details associated with voice-activated technology would be well understood by those of ordinary skill in the art.

Aspects of the present invention may be used in a variety of environments. For example only, street lights commonly rely on individual light sensors to turn on and off each light. Often, these light sensors break down, or the light burns out. Government workers usually have to rely on citizens to report burnt-out lights, or pay government workers to check the lights after hours. The present invention, in one preferred embodiment, permits a power control unit to be installed in each light fixture. In such an arrangement, government workers may individually or collectively test groups of lights regardless of the time of day. The advantages of such a system are many.

Figure 16:
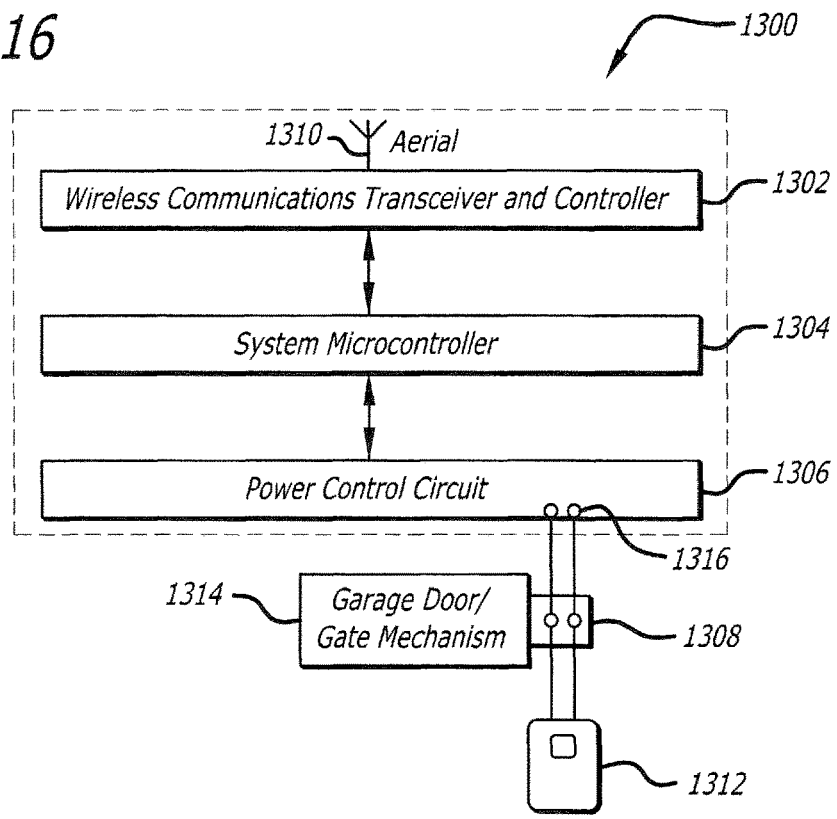
FIG. 16 is block diagram of the functional elements of a Power Control Unit in accordance with a further preferred embodiment of the present invention shown operationally connected to a garage door opener.
Figure 17:
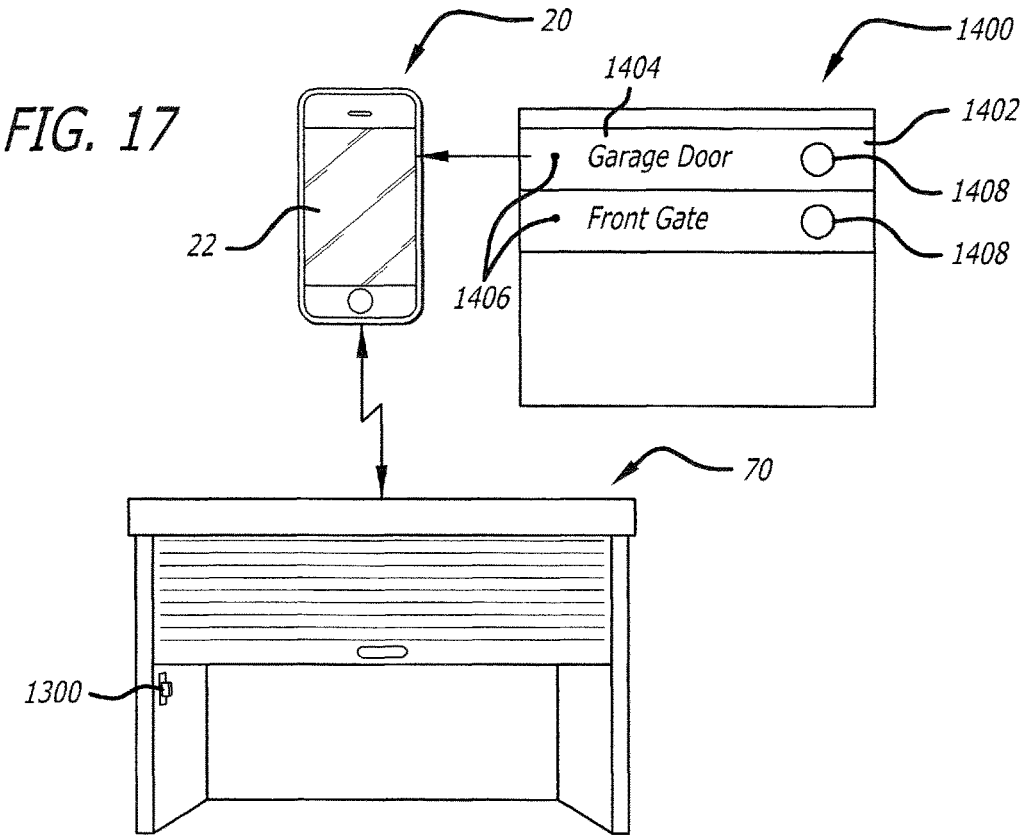
FIG. 17 is a pictorial representation of the product app running on the smartphone of FIG. 1 using a peer-to-peer communications link with the Power Control Unit of FIG. 16 to control the garage door.

Referring now to FIGS. 16 and 17, a Power Control Unit 1300 is shown in accordance with another preferred embodiment of the present invention. FIG. 16 shows a block diagram outlining the preferred embodiment of functional elements of power control unit 1300, which preferably has a wireless communications transceiver and controller 1302, system microcontroller with embedded memory 1304, power control circuits 1306 with wire terminals 1316, and an aerial 1310.

The commands and responses between system microcontroller 1304 and the smartphone are communicated through a radio frequency wireless link supported by wireless communications transceiver and controller 1302 and aerial 1310. Depending on cost and the desired operational functions, wireless communications transceiver and controller 1302 may include only a Wi-Fi radio, only a Bluetooth radio, only a NFC radio or any combination of those technologies. The Product App may communicate with any mix of power controlling elements and radio technologies which seamlessly provide the best communications link as the user moves through, or into, a controlled space. This allows a controlled space to be restricted to an approximate small radius from the controller or a large radius which provides increased flexibility for the user in the way the user configures and uses a preferred embodiment of the present invention.

Referring to FIG. 16, when wireless communications transceiver and controller 1302 operates according to the Wi-Fi Direct specification, it can communicate with devices that support Wi-Fi WLAN or Wi-Fi Direct on a peer-to-peer basis without the need for any intermediary hardware. Wireless communications transceiver and controller 1302 is preferably configured to operate as both a Wi-Fi Direct group participant and Wi-Fi Direct access point, allowing power control unit 1300 to appear to Wi-Fi WLAN devices during discovery as a Wi-Fi access point. After being discovered as a Wi-Fi Direct access point, a Wi-Fi Direct device is able to communicate peer-to-peer with Wi-Fi WLAN devices that support the IEEE 802.11 specification as amended from time to time. In this instance, a Wi-Fi WLAN device will receive a device discovery message from the power control unit as if from a Wi-Fi access point and be able to establish a communications link with a smartphone if the right is granted by the power control unit. The intricacies and procedures of establishing the communications link between a Wi-Fi Direct device and Wi-Fi WLAN devices are defined in the Wi-Fi Alliance specifications and would be understood by practitioners skilled in communications systems protocols.

System microcontroller 1304 preferably incorporates a firmware program which defines the operation and functions of the power control unit and assumes responsibility for running all program code and system elements, including specifying the operation of wireless communications transceiver and controller 1302 and operation of power control circuits 1306. System microcontroller 1304 may preferably include non-volatile memory to store any program data received from the Product App.

Referring to FIG. 16, in one preferred embodiment, power control circuits 1306 may include a switch configured to vary the supply of power to an attached garage door or gate mechanism 1314 to execute a simple open/close operation. Electrical wiring connected to the wire terminal 1316 is preferably connected to push button terminal 1308 of a garage door/gate mechanism 1314. Push button terminal 1308 is a common feature to most garage door mechanisms and allows for the connection of an external switch 1312 that can be used to manually activate a garage door mechanism without the use of a wireless clicker. The power control unit 1300, through power control circuits 1306, is preferably able to replicate the commands of an external switch 1312 and by connecting to push button terminal 1308 is able to activate the garage door/gate mechanism 1314 as though the garage door/gate mechanism had received a command from an external switch 1312. Push button terminal 1308 would usually be able to accommodate wires from both the power control circuit and an external switch so that the operation of an external switch 1312, or of a wireless clicker, is preserved in controlling the garage door/gate mechanism 1314.

It would be apparent to those skilled in the art that variations of this connection method are possible without departing from the spirit of the invention. By way of example only, power control circuits 1306 could have an additional wire terminal that allows for an external switch to be connected to power control unit 1300 so that only one set of wires from wire terminal 1316 connects to push button terminal 1308. Commands from such an external switch may pass through power control circuits 1306 to push button terminal 1308.

In another preferred embodiment, power control circuits 1306 may include a number of relays and a plurality of wire terminals configured to vary the supply of power to multiple garage door or gate mechanisms.

In another preferred embodiment, power control unit 1300 may preferably have the ability to support an external switch that would allow a user to disable or enable wireless communications transceiver and controller 1302. Such could be used by the user to easily put the power control unit into a "stand down" mode when away on vacation to prevent any wireless communication. It can be appreciated that other switch configurations and functions may be supported without departing from the scope of the present invention. In another preferred embodiment, it may be desirable to have no exposed human interface in order to reduce the incidence of vandalism or create a highly weather resistant unit.

In another preferred embodiment, power control unit 1300 may support the input of data from an NFC reader connected to the power control unit, transmitting to power control unit wirelessly, or embedded in the power control unit. System microcontroller 1304 may preferably be configured to interpret data from the NFC reader to determine if it should cause power control circuits to open or close a garage door or gate. In some preferred embodiments it may be preferable for system microcontroller 1304 to use data from the NFC reader to configure the wireless communications transceiver and controller 1302 or establish a peer-to-peer connection with a particular personal controller.

In another preferred embodiment, it may be preferable for power control circuits 1306 to be located outside of power control unit 1300, with power control unit 1300 controlling power control circuits 1306 wirelessly using a link such as sub-1 GHz radio rather than a hardware interface. Using this mechanism, a single power control unit could have the ability to control one or more garage door and/or gate mechanisms in a controlled area. This extension would preferably utilize a supporting radio to supplement power control unit 1300. The supporting radio may be a transmitter only, or a transmitter and receiver, depending on the application of power control circuits 1306. The supporting radio may be configured by the system microcontroller 1304 to operate at a number of different carrier frequencies. Data could be modulated onto those carrier frequencies such that the encoded data could be received, decoded and acted upon by a compatible radio receiver in a remote power control circuit that would then execute commands.

The supporting radio may be capable of FSK, GFSK, MSK, OOK or other modulation methods and be able to operate over a wide frequency range including the license free Industrial Scientific and Medical (ISM) frequencies, or may support specific proprietary standards such as Zigbee and Z-wave. While these specifications are applicable to most wireless sensor networks, home and building automation, alarm and security systems and industrial monitoring and control, there may be applications where a system compatible transceiver with specific frequency and modulation specifications is required. In these situations, a specific supporting radio could be provided within the embodiment described herein.

It will be appreciated that the system described above can be extended in many ways without departing from the scope of the present invention. The power control unit may be wholly integrated into a garage door and/or gate mechanism. Power control circuits 1306 may be configured to control devices such as blinds and shutters rather than garage doors and gates, allowing power control unit 1300 to control a range of products using a smartphone.

It will be appreciated that a single smartphone may be utilized with a plurality of power control units Thus, it can be appreciated that a single smartphone may be used to control unlimited different garage doors or gates, a task that present typically requires a dedicated clicker for each garage door or gate mechanism.

It will also be appreciated that a single power control unit may be utilized with a plurality of smartphones. Thus, multiple smartphones may be used to control the same garage door or gate, a task that present typically requires a dedicated clicker for each person wishing to control that garage door or gate mechanism.

FIG. 17 shows a pictorial representation of a Product App 1400 running on smartphone 20 using a peer-to-peer communications link with power control unit 1300 to control a garage door installed in garage 70 in accordance with one preferred embodiment of the invention. When the user touches the Product App icon on the touch sensitive graphical screen 22 of smartphone 20, the smartphone's operating system starts Product App 1400. The Product App preferably activates the wireless communications transceiver and control of smartphone 20, which searches for any power control units in wireless range. Power control unit 1300 in garage 70 preferably responds with a message to smartphone 20 that includes the name of the power control unit which is displayed by the Product App at 1404. One option during the configuration process is to allocate a name to the power control unit so it can be easily identified by the user. This is particularly useful for more complex arrangements where multiple power control units are present.

Prior to being able to communicate with each other, smartphone 20 and power control unit 1300 are paired preferably using the Wi-Fi Direct access point or group participant pairing procedure according to specifications outlined by the Wi-Fi Alliance. This only needs to be done once and then each time smartphone 20 is within wireless range of power control unit 1300, smartphone 20 can initiate a dialog using the exchange of serial data commands and responses. After a peer-to-peer communications link has been established, smartphone 20 can send commands to power control unit 1300 which, under the control of the system microcontroller 1304 and its firmware, will execute those commands.

Smartphone 20 may be configured to setup a wireless link with a paired power control unit 1300, but the program data which causes power control unit 1300 to execute one or more of its functions is preferably generated by the Product App. The Product App preferably determines the commands and responses smartphone 20 exchanges with power control unit 1300.

The Product App is preferably activated and controlled by the user through the smartphone's touch sensitive graphics screen 22. The Product App may be preloaded on a specific device, or could be downloaded from an appropriate server through a wireless network, Internet or computer.

Referring to FIGS. 16 and 17, the Product App is preferably designed to translate a user's requests inputted by the user via the smartphone's graphics screen 22 into specific commands that are transferred to power control unit 1300 through the transmitter of smartphone 20 to wireless communications transceiver and controller 1302 of power control unit 1300. Product App 1400 preferably presents its control interface as a combination of graphics and text on graphics screen 22.

As shown in FIG. 17, Product App 1400 preferably displays all power control units the Product App has been configured to communicate with in their own individual cells 1402, allowing the Product App to function as a wireless interface for multiple power control units. An icon or coloured light 1406 preferably provides a visually indication if the Product App is able to communicate with a particular power control unit in range. Touching the power control unit name 1404 preferably causes Product App 1400 to establish an active peer-to-peer link with the power control unit associated with that cell 1402. If a peer-to-peer connection is successfully established, coloured icon 1406 may display a new colour to indicate an active peer-to-peer connection with that particular power control unit. Touching button 1408 preferably sends a command to power control unit 1300, causing it to control garage door 70.

It will be appreciated that the steps described above may be performed in a different order, varied, or certain steps added or omitted entirely without departing from the scope of the present invention. By way of example only, pressing button 1408 may cause Product App 1400 to establish a peer-to-peer wireless link with the power control unit associated with button 1408 and then send the control data associated with button 1408 in a single sequence rather than require a peer-to-peer communications link to have already been established with associated power control unit prior to pressing button 1408.

Figure 18:
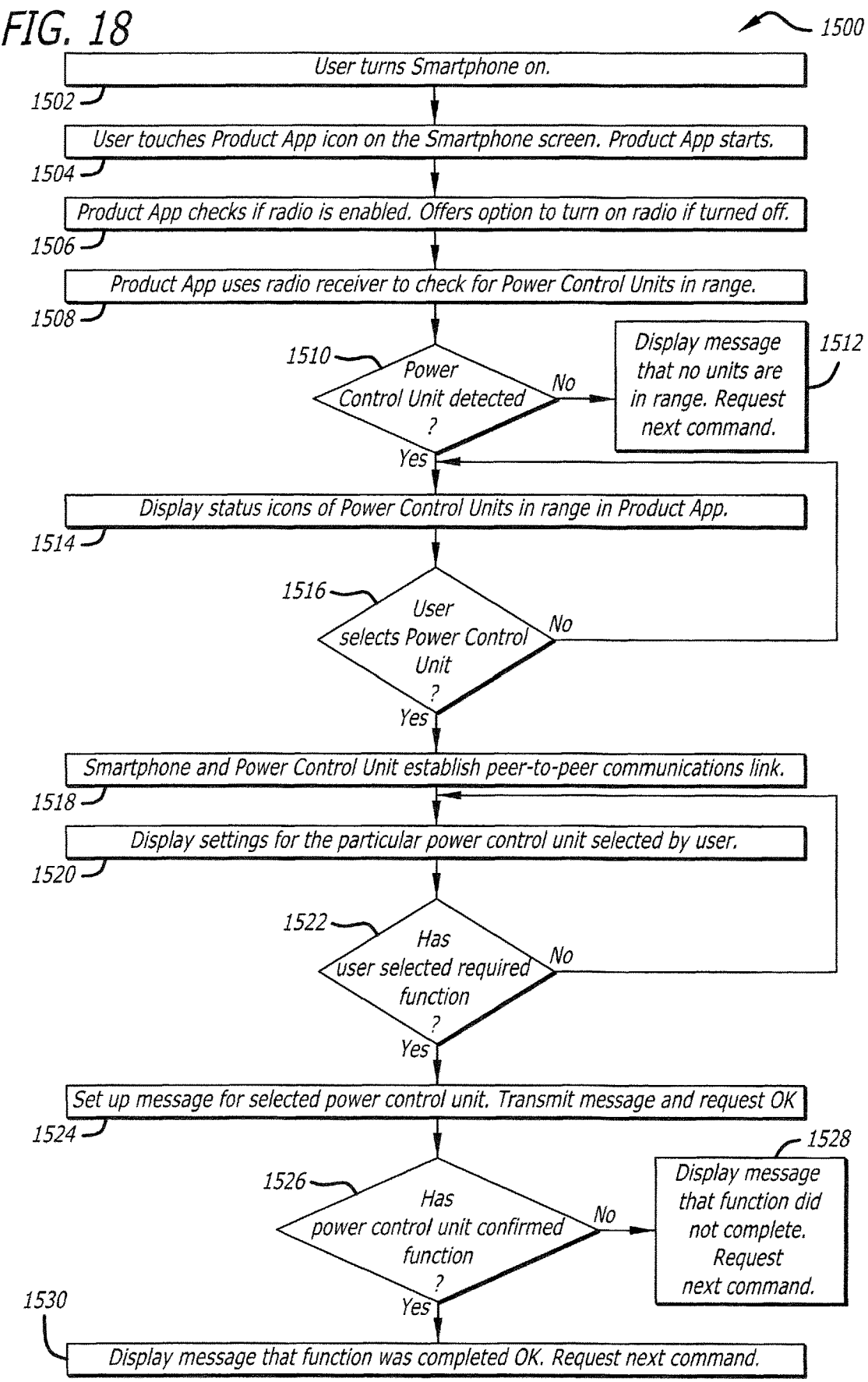
FIG. 18 is a flow diagram showing a sequence of events between a user and an applications program loadable onto the smartphone of FIG. 1 for discovery and communication with the Power Control Unit of FIG. 16.

Having described the preferred components of Power Control Unit 1300, a preferred method of use will now be described with reference to FIG. 18. FIG. 18 is a flow diagram of a method 1500 that includes actions taken by a user to discover and open communications with a power control unit in accordance with the user's instructions. Such actions are preferably conveyed to a power control unit by touching the available options presented by the Product App for that particular power control unit. Referring to FIG. 18, in step 1502, the user switches the smartphone ON and the smartphone operating system displays a number of icons on its graphics screen. The user may have to scroll or page the display to locate the icon for the Product App depending on the smartphone operating system and user preference. Once located, in step 1504 the user touches the Product App icon and the Product App activates. In step 1506 the Product App checks to see if the radio is active and if not, requests the user to turn it on. In some implementations, the Product App may automatically turn the radio on. Once on, the Product App in step 1508 scans its radio frequencies looking for power control units within wireless communications range. If in step 1510 no power control units are detected, the Product App proceeds to step 1512 and advises the user. In step 1514, if one or more power control units are detected, the Product App will preferably offer the user an option to add and configure a new power control unit if the Product App and a power control unit have not previously negotiated a peer-to-peer link, or will otherwise update the status icon 1406 in the power control unit cell 1402 (FIG. 17) to identify those power control units that are within range to form a peer-to-peer communications link for power control units that have previously been configured in the Product App.

If the user selects one of the displayed power control units with an icon indicating the power control unit is within range to form a peer-to-peer communications link in step 1516, the Product App in step 1518 will preferably display any prerequisites for establishing a peer-to-peer communications link between the smartphone and selected power control unit, the correct completion of which will establish a peer-to-peer link. Such prerequisites may include passwords or other security measures that may be part of the peer-to-peer standard or an additional security layer in the Product App or power control unit. If the smartphone and power control unit have previously established a peer-to-peer link, protocols for establishing a new link may be automatically exchanged and a link established on the user selecting their preferred power control unit at step 1516. If a communications link cannot be successful established at step 1518 with a selected power control unit, the Product App will preferably inform the user that link could not be established and Product App will then preferably default to step 1508.

Referring to FIGS. 17 and 18, if no power control unit is selected at step 1516, the Product App will continue to display the status icons 1406 of the power control units. The Product App may continually poll, or poll intermittently, to update the status of any paired power control units enabling the user to physical move with the smartphone and have the status icons for each power control unit dynamically update.

If at step 1518 a peer-to-peer communication link is established, at step 1520 the Product App may preferably update the product cell 1402 with any specific function buttons or settings that the power control unit may report back to the Product App. By way of example only, this may preferably include an open/close function button and icons or messages identifying error situations or other conditions or programmable parameters applicable to that particular power control unit. If nothing has changed in the configuration or operation parameters of the chosen power control unit since the user last interacted with it, it may preferably be that nothing changes visually in the Product App cell for that unit.

In step 1522, if the user selects a particular function for the active power control unit, the product App moves to step 1524 and transmits the function command to the power control unit. In step 1526, the Product App checks for a response from the power control unit and if it is not received, informs the user at step 1528 and waits for the next command. If the power control unit confirms the function has been executed, the Product App in step 1530 advises the user that the function requested was executed and then waits for the next command.

It will be appreciated that the steps described above may be performed in a different order, varied, or certain steps added or omitted entirely without departing from the scope of the present invention. By way of example only, if only one power control unit has been configured in the Product App, the Product App may automatically establish a peer-to-peer link if the power control unit is within wireless range. By way of another example only, pressing button 1408 may cause Product App 1400 to establish a peer-to-peer wireless link with the power control unit associated with button 1408 and then send the control data associated with button 1408 all in one series of steps rather than require a peer-to-peer communications link to have already been established with associated power control unit prior to pressing button 1408.

If at any stage the power control unit fails to perform any functions as expected, the user could preferably through the Product App cause power control unit to run a self diagnostic and report any errors or issues back to the Product App for the user to review. The Product App could preferably prepare a report for transmission to an external party for the purposes of providing technical support directly from the Product App or by using email, short message service, or any other communications method supported by the smartphone. The power control unit could also preferably keep a record of when and by whom the power control unit was activated which could be reported to the Product App.

The Product App may preferably include a voice recognition mode, whereby the user speaks "open door" and the Product App processes the voice command to establish a peer-to-peer communications link with a power control unit associated with that voice command and then sends an "open door" instruction to the power control unit. It will be appreciated that the voice recognition and activation of a power control unit could be integrated into separate software applications or core services of an operating system allowing for voice control of a power control unit by software or a core component running broader services than is provided by the Product App only.

It will be appreciated that the personal controller may be omitted by incorporating certain control and program functions directly into a microprocessor that is integrated into a vehicle which could be controlled by a touch user interface, button, voice activation and/or a combination thereof. Where a personal controller is used, instead of, or in addition to a graphical user interface, the personal controller may be configured with a voice-activated system that inputs data according to the voice commands of the user. The details associated with voice-activated technology would be well understood by those of ordinary skill in the art.

The features described with respect to one embodiment may be applied to other embodiments, or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A controller for controlling a security system through a wireless communications link with a personal controller so as to control a supply of electricity to the security system, the personal controller having a processor, a user interface, and a wireless communications transceiver, said controller comprising:
   a wireless control module operable for wireless communication with the personal controller, said wireless control module including an aerial, a radio transceiver, and a microcontroller, said microcontroller being configured in a first mode to operate said wireless control module using a peer-to-peer communications standard to communicate with the personal controller, said microcontroller being configured in a second mode to operate said wireless control module using a non-peer-to-peer communications standard to communicate with a network access point in a WLAN, said microcontroller being configured to change from the first mode to the second mode upon receiving instructions from the personal controller for said radio transceiver to operate in the second mode; and
   a power control circuit configured to vary the supply of electricity to the security system based at least in part on instructions communicated from the personal controller through said wireless control module.

2. The controller of claim 1, wherein said wireless control module is operable to simulate a network access point to communicate with said personal controller.

3. The controller of claim 1, wherein said microcontroller is configured to communicate with the personal controller in the first mode when first establishing a link with the personal controller.

4. The controller of claim 1, wherein said microcontroller is configured to directly control said power control circuit to vary the supply of electricity to the security system.

5. The controller of claim 1, further comprising a second microcontroller, said second microcontroller being configured to issue a command to the power control circuit to vary the supply of electricity to the security system.

6. The controller of claim 1, wherein said microcontroller is configured in the first mode to operate said radio transceiver using Wi-Fi Direct to communicate with the personal controller.

7. The controller of claim 1, wherein said microcontroller is configured in the second mode to operate said radio transceiver using the WLAN to communicate with the personal controller.

8. The controller of claim 1, wherein said microcontroller is configured to implement a command from an applications program to change operation of said controller from the first mode to the second mode.

9. A method for remotely controlling a security system to control a supply of electricity to the security system, the method comprising:
   initiating in a first mode of communication a two-way, peer-to-peer wireless communications link between a personal controller and a power control circuit, the power control circuit controlling the supply of electricity to the security system;
   receiving an instruction at the power control circuit to either:
      maintain the first mode of communication between the power control circuit and the personal controller; or change to a second mode of communication between the power control circuit and the personal controller utilizing a non-peer-to-peer communications link;

receiving a command at the power control circuit from the personal controller using one of the modes of communication to vary the supply of electricity to the security system; and varying the supply of electricity to the security system in accordance with the command.

10. The method of claim 9, wherein the power control circuit always sends a discovery message to initiate contact with the personal controller when operating in the first mode of communication.

11. The method of claim 9, wherein the second mode of communication utilizes a WLAN.

12. The method of claim 9, wherein the first mode of communication is maintained between the power control circuit and the personal controller, further comprising denying the personal controller access to the WLAN through the power control circuit.

\* \* \* \* \*